United States Patent
Zbarsky et al.

(10) Patent No.: US 11,157,514 B2
(45) Date of Patent: Oct. 26, 2021

(54) TOPOLOGY-BASED MONITORING AND ALERTING

(71) Applicant: Dropbox, Inc., San Francisco, CA (US)

(72) Inventors: David Zbarsky, New York, NY (US); Dylan Visher, Berkeley, CA (US); Zviad Metreveli, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 133 days.

(21) Appl. No.: 16/653,337

(22) Filed: Oct. 15, 2019

(65) Prior Publication Data
US 2021/0109949 A1    Apr. 15, 2021

(51) Int. Cl.
*G06F 16/27* (2019.01)
*G06F 16/2457* (2019.01)
*G06F 16/248* (2019.01)
*G06F 16/901* (2019.01)

(52) U.S. Cl.
CPC ........... *G06F 16/27* (2019.01); *G06F 16/248* (2019.01); *G06F 16/24578* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 7,509,343 B1 | 3/2009 | Washburn et al. | |
| 8,321,479 B2 | 11/2012 | Bley | |
| 9,081,834 B2 | 7/2015 | Bhave et al. | |
| 9,222,067 B2 | 12/2015 | Kessler et al. | |
| 9,251,481 B2 | 2/2016 | Richter et al. | |
| 9,665,088 B2 | 5/2017 | Nixon et al. | |
| 10,073,754 B2 | 9/2018 | Brewer et al. | |
| 10,257,057 B2 | 4/2019 | Bhave et al. | |
| 10,362,098 B2 | 7/2019 | McDuff | |
| 2011/0153603 A1 | 6/2011 | Adiba et al. | |
| 2014/0324862 A1 | 10/2014 | Bingham et al. | |
| 2015/0058681 A1 | 2/2015 | Lingannapeta et al. | |

(Continued)

FOREIGN PATENT DOCUMENTS

| WO | WO 2014/158182 A2 | 10/2014 |
|---|---|---|
| WO | WO 2019/099558 A1 | 5/2019 |

OTHER PUBLICATIONS

Bitincka, et al., "Optimizing Data Analysis with a Semi-structured Time Series Database", SLAML, dated Oct. 2010, 9 pages.

*Primary Examiner* — Kim T Nguyen
(74) *Attorney, Agent, or Firm* — Hickman Becker Bingham Ledesma LLP

(57) ABSTRACT

A topology-based monitoring and alerting system is disclosed. Streams of metric time series values emitted by computing nodes in a distributed computing system that are relevant to the queries are aggregated in query caches in a historically accurate manner. Submissions of the queries for progressing time periods are answered from the query caches with historically accurate query results. Because streamed metric time series values are pre-aggregated in the query caches prior to a submission of a query for a time period, the submission can be answered with computational efficiently from the query cache established for the query while providing a historically accurate query result.

17 Claims, 7 Drawing Sheets

(56) References Cited

U.S. PATENT DOCUMENTS

| | | | |
|---|---|---|---|
| 2016/0020917 A1* | 1/2016 | Tuatini | H04L 41/026 |
| | | | 709/206 |
| 2016/0034504 A1 | 2/2016 | Borah | |
| 2016/0092124 A1 | 3/2016 | Cowling et al. | |
| 2018/0129708 A1* | 5/2018 | Beavin | G06F 16/2453 |
| 2018/0336199 A1* | 11/2018 | Ignatyev | G06F 16/2282 |
| 2019/0050321 A1* | 2/2019 | Sapozhnikov | G06F 11/3664 |
| 2019/0228100 A1* | 7/2019 | Potu | G06F 16/38 |
| 2019/0310943 A1* | 10/2019 | Noll | G06F 12/126 |
| 2019/0324964 A1* | 10/2019 | Shiran | G06F 16/24542 |
| 2020/0073867 A1* | 3/2020 | Zhou | G06F 16/24562 |
| 2021/0109949 A1* | 4/2021 | Zbarsky | G06F 16/24578 |

\* cited by examiner

500

Establish a query cache for a topology-join query.
510

Aggregate metric time series values relevant to the topology-join query by distinct node property time series values relevant to the topology-join query in the query cache in a historically accurate manner.
520

Obtain a submission of the topology-join query.
530

Determine a historically accurate result for the submission of the topology-join query based on the query cache.
540

Return the historically accurate result to a submitter of the topology-join query.
550

Figure 5

TOPOLOGY-BASED MONITORING AND ALERTING

FIELD OF THE INVENTION

Some disclosed embodiments relate to monitoring and alerting for computing components in a distributed computing system.

BACKGROUND

In a distributed computing system, computing components operate on different networked computing devices and communicate and coordinate their operations by passing network messages between them. A large-scale computer application offered to users over the Internet may operate on a distributed computing system housed in one or more Internet-connected data center facilities. Some examples of large-scale computer applications include content management computing systems.

Content management systems may provide features enabling end-users to manage and collaborate on digital content items such as, for example, files, folders, digital data, photos, text, audio, video, streaming content, online documents, online spreadsheets, etc. The features provided by content management may include, for example, the ability for end-users to share content items with other end-users, the ability to synchronize content items across one or more computing devices, the ability for end-users to collaborate on the authoring of content items, and the ability for end-users to manage content items across different hardware and different operating system platforms.

Essential to the successful operation of a large-scale computer application is monitoring and alerting. Monitoring and alerting may encompass observing how computing components of a distributed computing system are performing and notifying technical personnel when computing components are not performing as expected. To do this, a monitoring and alerting computing system may be used to collect hundreds, thousands, millions, billions, or more metrics per minute from the computing components in the distributed computing system. Ingesting metrics at these rates and making them available for flexible and efficient historical querying is a technical challenge.

Disclosed embodiments address this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

BRIEF DESCRIPTION OF THE DRAWINGS

In the drawings:

FIG. 5 depicts a process for processing a topology join query, according to some disclosed embodiments.

DETAILED DESCRIPTION

Figure 1:
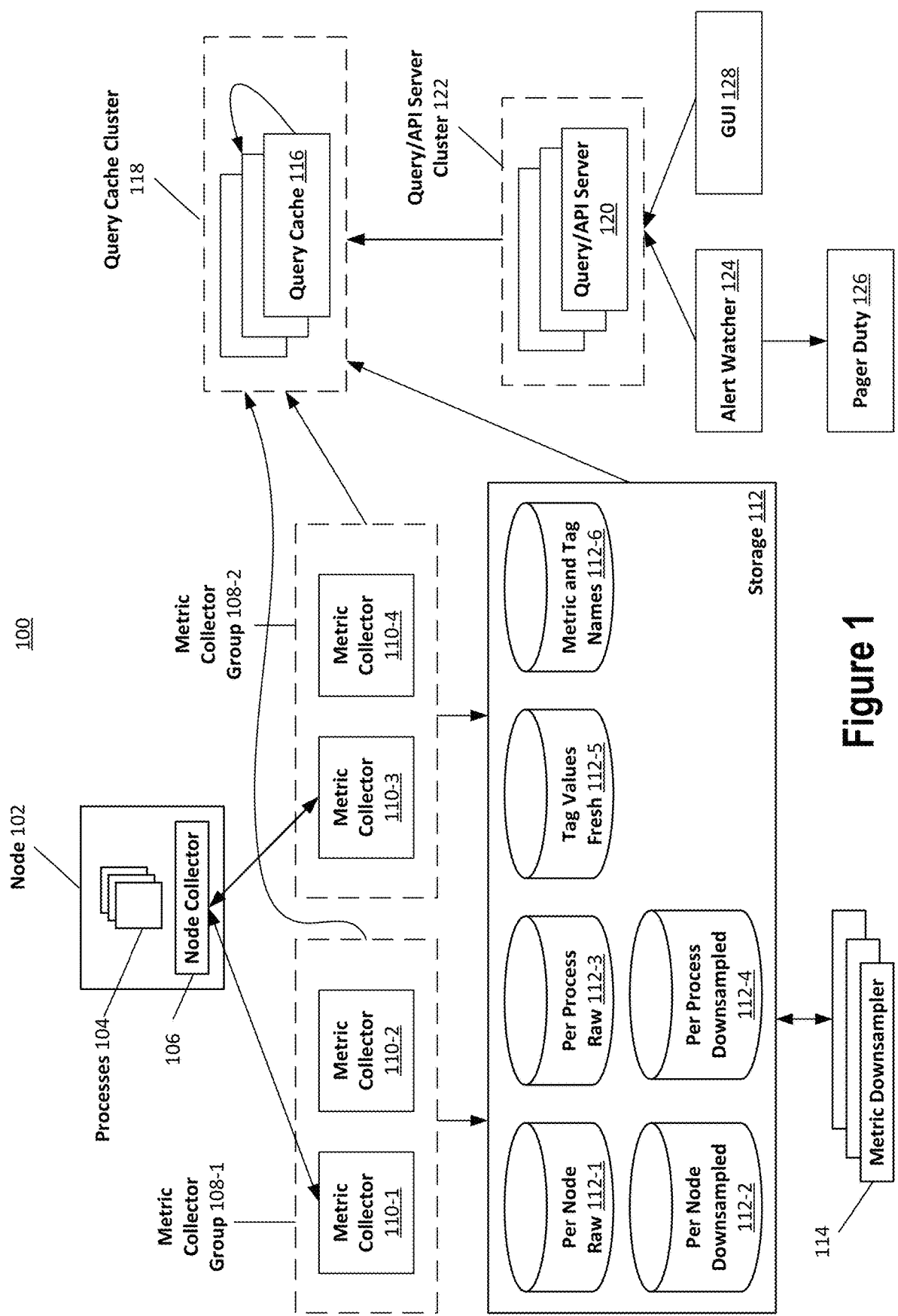
FIG. 1 illustrates an example topology-based monitoring and alerting computing system, according to some disclosed embodiments.

In the following description, for the purposes of explanation, numerous specific details are set forth in order to provide a thorough understanding of some disclosed embodiments. It will be apparent, however, that some disclosed embodiments may be practiced without these specific details. In other instances, some structures and devices are shown in block diagram form in order to avoid unnecessarily obscuring some disclosed embodiments.

Terminology

Before providing a general overview of some disclosed embodiments, some general terminology will be discussed. The following definitions are offered for purposes of illustration, not limitation, in order to assist with understanding the discussion that follows.

As used herein, the term "metric" is used in some contexts to refer to an aspect of computing or networking performance in a distributed computing system that is measured. Such aspects may include, but are not limited to, availability, response time, channel capacity, latency, completion time, service time, bandwidth, throughput, relative efficiency, scalability, performance per watt, compression ratio, instruction path length, speed up, or other aspect of computing or networking performance that is capable of being measured. No particular metric or set of metrics is required and virtually any metric or set of metrics that measures an aspect of computing or networking performance in a distributed computing system can be used.

As used herein, the term "metric time series" is used in some contexts to refer to pairs of metric values and associated timestamps.

As used herein, the term "metric value" is used in some contexts to refer to a measurement of a metric at a node in a distributed computing system.

As used herein, the term "node" is used in some contexts to refer to a computing node in a distributed computing system. For example, a node can be a computing device, a virtual machine that runs on a Type-1 or Type-2 hypervisor, an operating system container, or other physical or virtual computing node.

As used herein, the term "node property" is used in some contexts to refer to an aspect of computing nodes in a distributed computing system that is sampled. Such aspects may include, but are not limited to, owner name, project name, deployment name, application name, feature name, package name, configuration revision, hardware class, operating system kernel version, cluster identifier, pocket identifier, zone identifier, cell identifier, or any other aspect of computing nodes in a distributed computing system that is capable of being sampled. No particular node property or set of node properties are required and virtually any node property or set of node properties that can be sampled and used to identify a set of one or more computing nodes in a distributed computing system can be used.

As used herein, the term "node property time series" is used in some contexts to refer to pairs of node property values and associated timestamps.

As used herein, the term "node property value" is used in some contexts to refer to a sample of a node property at a node in a distributed computing system.

As used herein, the term "time series" is used in some contexts to refer to pairs of values and associated timestamps.

As used herein, the term "time slot" refers to a range in time. A time slot may be defined by a given timestamp. For example, if a timestamp identifies a minute in time, then a time slot may be that identified minute. A time slot may be defined by two given timestamps. For example, a time slot may be the range in time spanned by the two given timestamps. A time slot may be defined by a given timestamp and a predetermined time amount. For example, a time slot may be defined as the range in time starting at the given timestamp and ending at the predetermined time amount after the given timestamp.

As used herein, the term "timestamp" refers to information that identifies a point or a range in time. The information may indicate the point in time or the range in time relative to another point in time or range in time. For example, a timestamp could be a number of time units (e.g., seconds) prior to or since a predetermined epoch. As another example, a timestamp could be a number of time units prior to or since the point in time or the range in time identified by another timestamp.

General Overview

A possible approach to address or mitigate the technical challenges identified in the Background section above is to use a publish/subscription message queue implemented as a distributed transaction log. One example of such a message queue is the Apache Kafka stream processing computing system. Tagged metrics may be published to the message queue and stored in the transaction log, metrics aggregated across tags and over time (e.g., downsampled), and the results stored back to the transaction log. Consumer computing processes may consume aggregated metrics from the message queue, evaluate them for alerting, and archive them in a distributed database computing system such as, for example, the Apache HBase database computing system, where they are available for historical querying.

Depending on the implementation, the possible approach may suffer from a number of issues. One issue may be unsatisfactory processing of "topology join" queries. Generally, a "topology" encompasses a set of one or more node properties by which same nodes in a distributed computing system can be identified. A "topology join" query may refer to a historical query that groups (breaks down) a selected metric by a selected node property for an associated period of time. The selected metric may be one of tens or hundreds or more possible metrics available for selection in a topology join query. Similarly, the selected node property may be one of tens or hundreds or more possible node properties available for selection in a topology join query. Different topology join queries may select different metrics and different node properties.

An example of a topology might be a "node" topology that encompasses an operating system kernel version node property. In this case, one example of a topology join query might be to compute the $95^{th}$ percentile request processing latency of a particular network service for a historical period of time (e.g., the past seven days, the past 24 hours, the past ten minutes, the past five minutes, etc.) grouped by (broken down by) operating system kernel version. In this example, request processing latency is the selected metric and operating system kernel version is the selected node property. The particular network service may operate on many computing nodes in a distributed computing system including nodes configured with different versions of an operating system kernel. Thus, the query may be intended to produce a result that provides the $95^{th}$ percentile request processing latency of the particular network service for the specified period of time where the latency is grouped by (broken down by) the different operating system kernel versions of the nodes running the particular network service.

A technical challenge processing a topology join query may be the historically accurate join of a metric time series for the selected metric with a node property time series for the selected node property. In particular, for historical accuracy, metric values of the metric time series should be joined with node topology values of the node property time series by time slot correspondence. For example, returning to the example topology join query in the preceding paragraph, for historical accuracy, request processing latencies observed at nodes for the specified period of time that are summarized into the $95^{th}$ percentile request processing latency for a particular operating system kernel version should include only latencies that are reported at a node at the same time that the node also reports the particular operating system kernel version and should not include latencies that are reported at a node at the same time that the node also reports an operating system kernel version other than the particular operating system kernel version. Meeting this requirement of historical accuracy for different topology join queries may pose a significant technical challenge at large scale because of the sheer number of number of nodes, metrics, and node properties involved.

A possible approach is to avoid this technical challenge altogether. For example, a distributed database computing system for historical querying of metrics may store only current (latest known) node properties of nodes. For example, the system might store only the current (latest known) operating system kernel version for each node. However, by storing only current (latest) node properties of nodes, it may not be possible to accurately answer historical queries across time. For example, if the operating system kernel on a node was upgraded from a first version to a second version at a particular point in time, it may not be possible to group (break down) (a) metrics emitted from the node before the particular point in time while running the first kernel version separately from (b) metrics emitted from the node after the particular point in time while running the second kernel version.

Another possible approach to meeting this technical challenge is to store each metric value or each metric time series reported by each node with a set of tags where each tag in the set specifies a node property value that the node had for the period of time to which the metric value or the metric time series applies. This approach may facilitate accurately answering topology join queries but may not scale well as the metric ingestion rate, the number of nodes, the number of different metrics, and the number of different node properties increase. For example, the distributed database computing system may need to store N different node properties for each metric value or each metric time series reported by each node. In a distributed computing system with hundreds or thousands of nodes that collectively report metric values on the order of millions or even billions of metrics per minute, this may require an impractical or expensive amount of data storage space and/or result in long query processing latencies for topology join queries.

The issues identified above in the background section and other issues are addressed or mitigated with the disclosed topology-based monitoring and alerting computing system. The system maintains a query cache for a topology join query submitted to the system. The topology join query may select a "target" metric to group by (break down by) according to a selected "target" node property for an associated "target" time period.

As just one non-limiting example of a topology join query, consider the following example query statement that is expressed in a particular metric query language:

request_latency_ms[_p,@kernel_version]
@node{_task="vortex_query",_p="p95"}

According to some disclosed embodiments, the above-example query statement is used to compute the $95^{th}$ percentile query processing latency of a particular network service (in this example the network service is named vortex_query) compared by operating system kernel version for an associated time period (e.g., the past five minutes). For example, the vortex_query network service might execute as a number of server computing processes on multiple nodes of a distributed computing system where the nodes might be configured with different versions of an operating system kernel.

For example, the query results for this query might be used to present a two-dimensional line chart in a graphical user interface that plots a point for each distinct operating system kernel version reported by the nodes. The vertical y-axis of the chart may represent query processing latency and the horizontal x-axis of the chart may represent time. In this case, each point for a corresponding operating system kernel version might chart the $95^{th}$ percentile query processing latency of the particular network service for the associated target time period at the node(s) configured with the corresponding operating system kernel version. In this way, any significant difference between the $95^{th}$ percentile request processing latency of the network service on different operating system kernel versions can be identified.

It should be noted that the above-example query statement is expressed in a particular query language which is described in greater detail elsewhere in this disclosure. However, it should be understood that no particular query language is required and other query languages for formulating query statements that express topology join queries may be used.

As indicated, to support efficient and accurate processing of a topology join query such as the example topology join query above, a query cache for the query may be established. The query cache may aggregate a target metric time series emitted by nodes in a distributed computing system according to distinct node property values of a target node property time series in a historically accurate way. In particular, a target metric value emitted by a node is aggregated in the query cache by a particular target node property value if the target metric value and the particular target node property value were emitted by the node in the same time slot. By doing so, the query can be efficiently answered from the query cache in a historically accurate way, thereby improving the operation of monitoring and alerting computing systems.

This and other disclosed embodiments will now be described in greater detail with respect to the figures. For example, in some disclosed embodiments, a query cache can be maintained for a tag-join query instead of a topology-join query. The query cache for a tag-join query may aggregate a target metric time series emitted by nodes in the distributed computing system according to distinct tag values of a target tag time series in a historically accurate way. In particular, a target metric value emitted by a node is aggregated in the query cache by a particular tag value if the target metric value and the particular target tag value were emitted by the node in the same time slot. By doing so, the tag-join query can be efficiently answered from the query cache in a historically accurate way, thereby improving the operation of monitoring and alerting computing system in processing tag-join queries.

Topology-Based Monitoring and Alerting Computing System

FIG. 1 illustrates example topology-based monitoring and alerting computing system 100, according to some disclosed embodiments. System 100 is illustrated and described herein as an example of a possible topology-based monitoring and alerting computing system. Other suitable topology-based monitoring and alerting computing systems may have fewer, more, or different components, or the same components arranged in a different configuration than shown and described.

System 100 may exist in a networked computing environment. For example, the networked computing environment may exist in a one or more data center facilities or other computing and network resource hosting facilities. In some disclosed embodiments, the networked computing environment is Internet Protocol (IP)-based. However, other network-layer protocols may be used.

Node

System 100 may include node 102. Although only a single node is illustrated in FIG. 1, system 100 may in practice include multiple nodes (e.g., hundreds, thousands, or millions) like node 102. Collectively, the multiple nodes may implement a large-scale computer application such as, for example, a content management system that is offered to end-users over a data communications network (e.g., the Internet).

The large-scale computer application may include computing services ("services"). The computing services may include network services and non-network services. Network services may include, for example, database servers, web servers, application servers, or other servers that receive and process network requests sent from clients. Non-network services may include daemons, watchers, garbage collectors, event handlers, or other computing services that perform functions not involving receiving and processing network requests sent from clients.

Each service may have an owner. The owner of a service may be an individual or a team of people responsible for developing and managing the service as part of a project. Services may be deployed as executable programs and/or run-time linkable or loadable libraries to nodes in system 100 as part of deployments using packages of package management system. For example, a package may contain binaries, other executables, and/or run-time linkable or loadable libraries. Configuration information for a computing service may be associated with a source code control revision hash (e.g., a SHA-1 hash) such as, for example, a GIT revision hash. In some disclosed embodiments, node properties of a particular topology include service name, service owner, project name, deployment name, package identifier, and configuration revision hash.

Node 102 may encompass a computing device. The computing device may belong to a hardware class. A hardware class may encompass a grouping of physical computing devices in system 100 according to their intended application use. The computing devices in a hardware class may be especially configured to support the intended application. For example, there may be a "database" hardware class that encompasses computing devices configured with relatively large amounts of volatile memory (e.g., RAM), a "compute" hardware class that encompasses computing devices configured with central processing units (CPUs) and/or graphics processing units (GPUs), and a "storage" hardware class the encompasses computing devices configured with an array of mass storage devices (e.g., an array of hard disks). The computing device may also have a hardware revision. In some disclosed embodiments, a hardware revision is relative to a hardware class and indicates a particular configuration of the computing device. For example, a computing device in the "compute" hardware class may have a hardware revision of "1" indicating that the computing device has 32 CPU cores, 96 gigabytes of RAM, and a 500 gigabyte mass storage device while hardware revision "2" within the "compute" hardware class may have 48 CPU cores, 64 gigabytes of RAM and a 1 terabyte mass storage device. An operating system kernel of the computing device may have a version. In some disclosed embodiments, node properties of a particular topology include hardware class, hardware revision, and operating system kernel version.

Node 102 may provide a database service instance such as, for example, a MySQL database service instance. The database service instance at node 102 may belong to a database service category, which may indicate the type or kind of data managed by the database service instance. The database service at node 102 may have a target database class, which may indicate the role of the database service instance such as, for example, whether the database service instance is a primary (e.g., active) database service instance or a secondary (e.g., standby) database service. The database service instance at node 102 may belong to a cluster of database service instances. The database service instance at node 102 may encompass one database shard of multiple database shards of a database distributed across multiple nodes. In some disclosed embodiments, node properties of a particular topology include database service category, target database class, cluster identifier, and shard identifier.

Node 102 may encompass a data storage device in a distributed data storage system such as, for example, a data storage device in the append-only distributed data storage system described in U.S. patent application Ser. No. 14/497, 195, entitled "Append-Only Storage System Supporting Open and Closed Extents," filed Sep. 25, 2014, the entire contents of which is hereby incorporated by reference. The data storage device may belong to a shared-nothing "pocket" or shared-nothing "bucket". For example, system 100 may encompass a pocket or bucket for storing data files in data blocks and a distinct pocket or bucket for storing thumbnail digital images. The data storage device may belong to a "zone" within a pocket or bucket. For example, a zone may correspond to a physical data center in a particular geographic location. The data storage device may belong to a "cell" within a zone. For example, the cell may encompass a number of data storage devices that all belong to the cell. In some disclosed embodiments, node properties of a particular topology include pocket or bucket identifier, zone identifier, and cell identifier.

According to some disclosed embodiments, node 102 corresponds to a physical computing device configured with an operating system on which processes 104 execute. However, mode 102 may correspond to a virtual machine that hosts an operating system on which processes 104 execute. In this case, the virtual machine may itself execute on a physical computing device with the aid of a Type-1 or Type-2 hypervisor. Alternatively, node 102 may correspond to an operating system container that hosts a virtual operating system on which processes 104 execute.

All nodes in system 100 may correspond to physical computing devices, virtual machines, or containers. However, a mix is also possible. Some nodes in system 100 may correspond to physical computing devices. Some nodes in system 100 may correspond to virtual machines. Some nodes in system 100 may correspond to containers.

Figure 7:
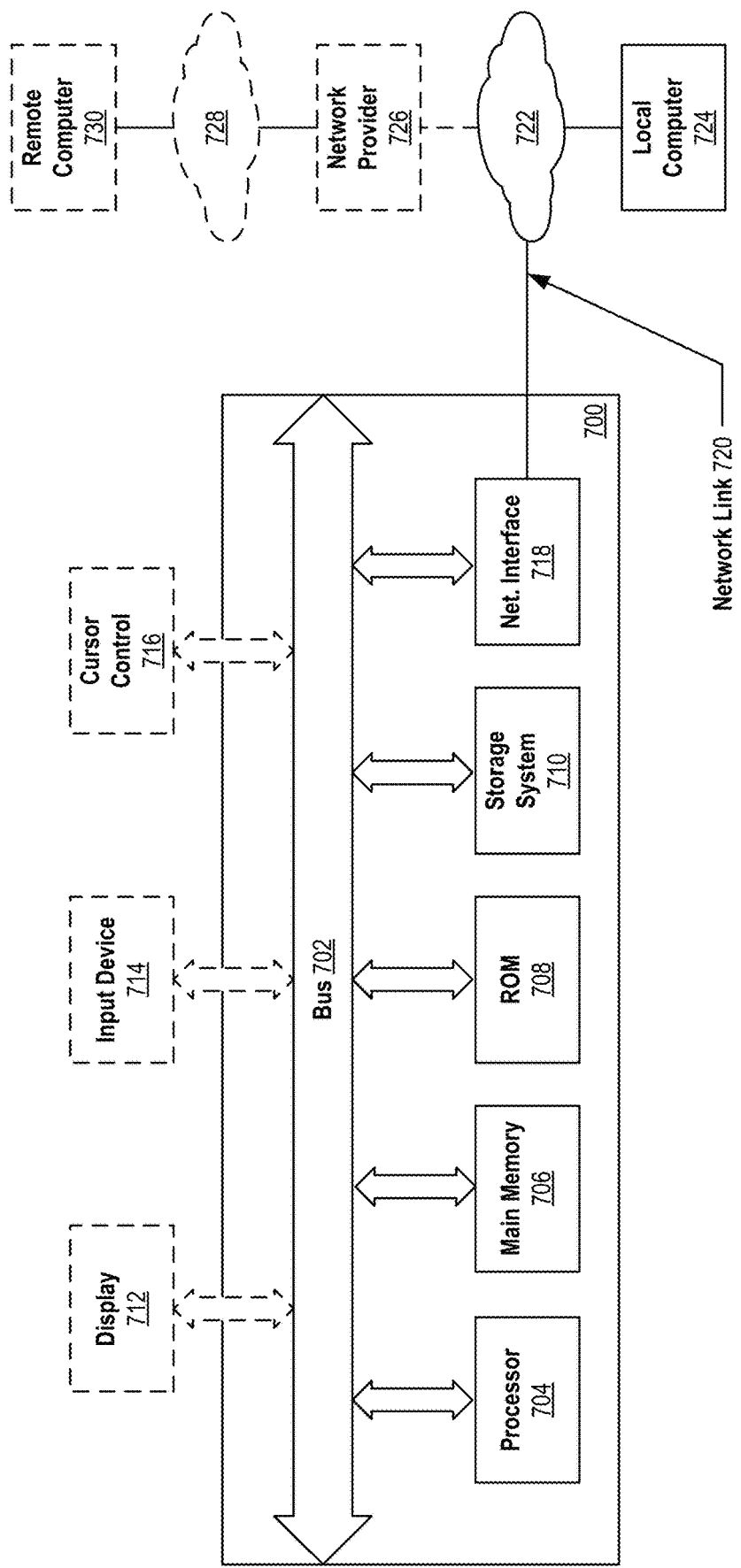
FIG. 7 is a block diagram of a computing device, according to some disclosed embodiments.

Node correspondence need not be exclusive. For example, one node may correspond to a physical computing device and another node may correspond to a container or virtual machine that executes on that computing device. It should be understood that the term "computing device," as used herein, is not intended to be limited to any particular type of computing device and a computing device in system 100 may be a server computing device, a network computing device, a data storage computing device, or any other type of computing device controlled by one or more central processing units (CPU) or the like. System 100 may include different types of computing devices. An example computing device is illustrated in FIG. 7 and described below.

According to some disclosed embodiments, node 102 is associated with an identifier ("node identifier") that uniquely identifies node 102 amongst all nodes in system 100. For example, the node identifier can be a hostname, a network address, a hardware chassis identifier, a BIOS ID, or other information that may be programmatically determined at node 102 such as, for example, by reading a node identifier from a file system file stored at node 102 or by invoking an operating system call at node 102 such as, for example, gethostname( ), and that may be used to uniquely identify node 102. Each node in system 100 may be associated with a corresponding node identifier.

Process

According to some disclosed embodiments, processes 104 are each an instance of a computer program that executes at node 102. Each process may contain program code and its activity (e.g., data). Depending on the operating system on which processes 104 execute, a process may encompass multiple threads of execution that execute instructions concurrently.

Node Collector

According to some disclosed embodiments, node collector 106 is a process or set of processes that executes on node 102. In operation, node collector 106 may poll processes 104 on node 102 for metrics or otherwise obtain metrics from processes 104. Node collector 106 may aggregate at node 102 metrics obtained from processes 104 into per-node and per-process metrics.

Various different types of metrics can be obtained by node collector 106. In some disclosed embodiments, the different types of metrics that can be obtained include counters, gauges, histograms, and topologies.

According to some disclosed embodiments, a counter metric records the number of times an event happens. For example, a counter metric may be used to count the number of times a particular process at node 102 successfully handles a network request.

According to some disclosed embodiments, a gauge metric records a fixed value. For example, a gauge metric may record the number of worker threads of a process at node 102.

According to some disclosed embodiments, a histogram metric records observations and computes summary statistics therefrom. For example, a histogram metric may provide an approximate percentile distribution for observed values. For example, the observed values may be request processing latencies of a particular process at node 102 and the summary statistics may include a Xth percentile request processing latency of the observed values where X is 75, 95, 99, etc.

According to some disclosed embodiments, a topology metric is a special type of gauge metric that can be used to identify nodes in a topology join query. A topology metric can be used in a topology join query to allow querying only from nodes that also match a topology query. For example, a topology metric may allow a topology join query to query a particular metric from nodes that are also reporting a particular node property value.

Metric Collector

System 100 includes groups 108 of metric collectors 110. Groups 108 may be physically isolated on separate computing devices for redundancy and high-availability in case one group is taken offline, fails, or is compromised. System 100 may also include multiple groups 108 for horizontal scalability.

Each group (e.g., 108-1) may include multiple metric collectors for redundancy, high-availability, and horizontal scalability. For example, group 108-1 includes metric collector 110-1 and metric collector 1102. And group 108-2 includes metric collector 110-3 and metric collector 110-4. Although it is possible for a group (e.g., 108-1) to have more than two metric collectors. Each metric collector (e.g., 110) may execute as a process or a set of one or more processes on a node in system 110. There may be many fewer metric collectors 110 in system 100 than there are nodes from which metric collectors 110 collect metrics.

According to some disclosed embodiments, metric collectors 110 are responsible for periodically (in a regular periodic manner or intermittently) or regularly (at a constant frequency or pattern) polling node collectors (e.g., 106) at nodes (e.g., 102) in system 100 for new metric values. For example, metric collector 110-1 may poll node collector 106 at node 102 approximately every ten seconds for new metric values. However, other periodic or regular polling intervals are possible according to the requirements of the particular implementation at hand (e.g., every 30 seconds and/or in response to detecting an event).

Multiple metric collectors may poll the node collector at the same node at the same time or at different times. This may be done for redundancy, high-availability, or to balance the polling workload over multiple node collectors. In some disclosed embodiments, the multiple metric collectors that poll the node collector at the same node are distributed over different groups 108. For example, in system 100, metric collector 110-1 in group 108-1 polls node collector 106 at node 102 and metric collector 110-3 in different group 108-2 polls node collector 106 at node 102. By doing so, if a metric collector group fails or goes offline, metrics may still be collected from the node by a metric collector in another group. For example, if metric collector 110-1 or metric collector group 108-1 fails or goes offline, metrics may still be collected from node collector 108 at node 102 from metric collector 110-3 of group 108-2.

It is not necessary for the same metric collector to poll the node collector at the same node, although such an implementation is not prohibited. For example, in system 100, polling responsibilities within group 108-1 may be divided between metric collector 110-1 and 110-2. Metric collector 110-1 may poll node collector 106 at node 102 for some time and then metric collector 110-2 may poll node collector 106 at node 102 for another time, as part of balancing polling workload amongst metric collectors 110-1 and 110-2 in group 108-1. Alternatively, metric collectors 110-1 and 110-2 may poll node collector 106 at node 102 at the same time for redundancy, high availability, or to balance the polling workload across different metrics. In another possible configuration, metric collector 110-2 may be a backup or standby metric collector in case metric collector 110-1 fails or goes offline. In this case, metric collector 110-2 may poll node collector 106 at node 102 while metric collector 110-1 is in a failure state or offline state. In yet another possible configuration, multiple metric collectors in a group (e.g., 108-1) may poll the node collector at the same node for redundancy and high-availability.

Metric Bucket

As a result of polling nodes in system 100 over time, metric collectors 110 may receive metric time series and node property times series from nodes in system 100. Each metric time series may include a series of metric values ordered in time by time slots. Likewise, each node property time series may include a series of node property values ordered in time by time slots. A set of one or more metric values and a set of one or more node property values obtained from the same node for the same time slot is referred to herein as a "metric bucket." Metric collectors 110 may receive metric values and node property values from nodes in system 100 in metric buckets. A metric bucket may be transported over a data communications network (e.g., an IP network) from a node collector (e.g., 106) at a node (e.g., 102) to a metric collector (e.g., 110-1) in a data serialization format such as, for example, JavaScript Object Notation (JSON), eXtensible Markup Language (XML), ASN.1, or other data serialization format suitable for packaging and transporting character string and numerical data between nodes and over a data communications network.

Figure 2:
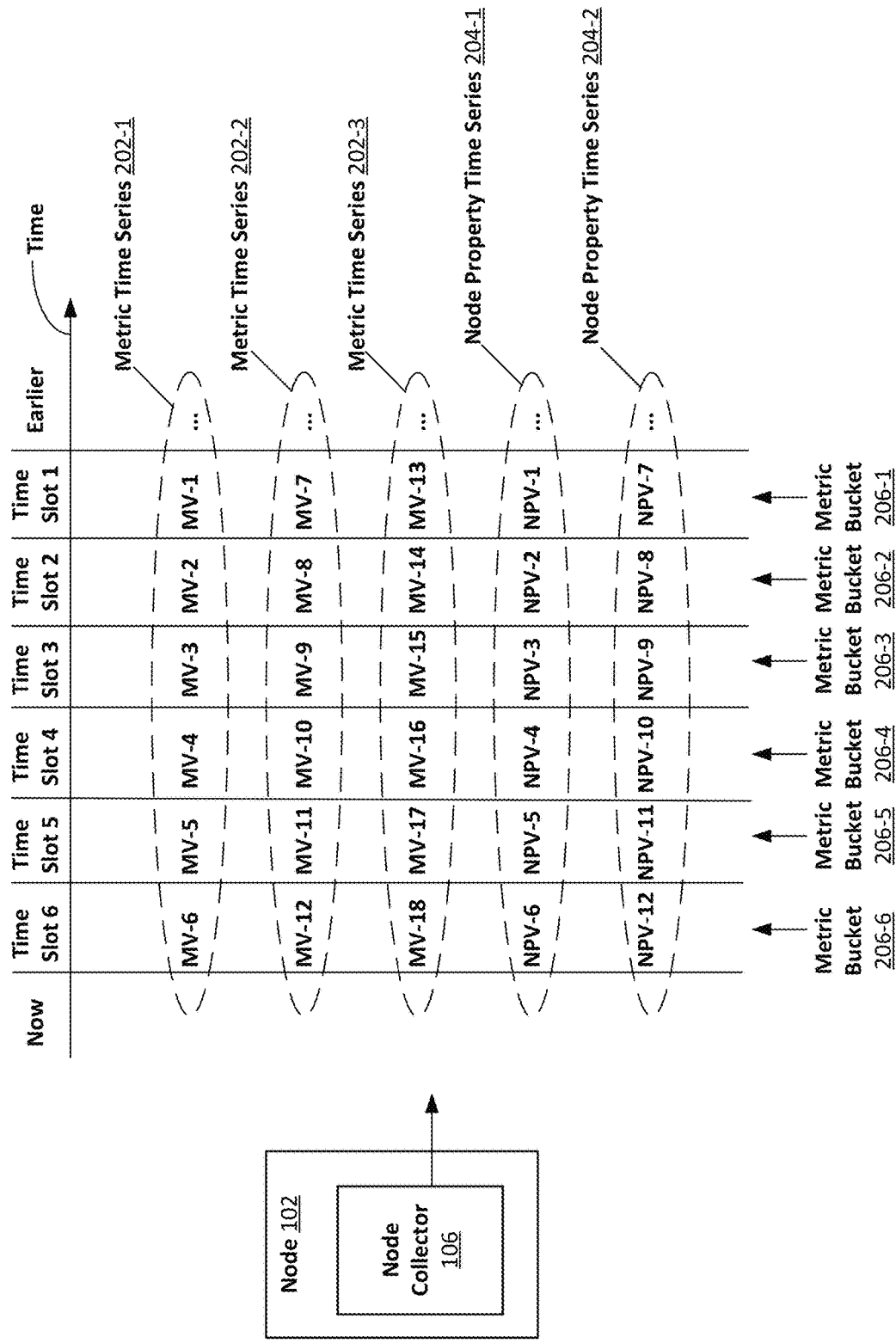
FIG. 2 illustrates metric buckets, according to some disclosed embodiments.

FIG. 2 illustrates metric buckets, according to some disclosed embodiments. Node collector 106 at node 102 provides metric buckets 206 to a metric collector (e.g., 110-1) over a data communications network (e.g. an IP network). Each of metric buckets 206 is provided in a corresponding time slot. For example, node collector 106 provides metric bucket 206-1 to the metric collector in a first time slot, then sometime later provides metric bucket 206-2 to the metric collector in a second time slot after the first time slot, then sometime later after provides metric bucket 206-3 to the metric collector in a third time slot after the second time slot, then sometime later still provides metric bucket 206-4 to the metric collector in a fourth time slot after the third time slot, and so on. For example, the first, second, third, fourth, etc. time slots may each span a non-overlapping or contiguous range of time (e.g., ten seconds). For example, the first time slot may correspond to a first ten seconds, the second time slot may correspond to the ten seconds in time immediately following the first ten seconds, the third time slot may correspond to the next ten second in time after that, and so on. While all time slots may be the same length in duration (e.g., ten seconds), different time slots may have different durations and there is no requirement that all time slots have the same duration.

Each of the metric buckets 206 may include one or more metric values from one or more metric time series and one or more node property values from one or more node property time series. In the example of FIG. 2, there are three metric time series 202-1, 202-2, and 202-3 and two node property time series 204-1 and 204-2. However, a metric bucket can have as few as one metric value from one metric time series and more than three metric values from more than three metric time series. Likewise, a metric bucket can have as few as one node property value from one node property time series or more than two node property values from more than two node property times series. It is also possible for a metric bucket to have no metric values or no node property values.

A metric value of a metric time series may be non-cumulative. For example, if metric time series 201-1 is for a counter metric that records the number of successful requests processed by a particular network service at node 102, then metric value MV-1 may contain a count of a number of requests successfully processed at node 102 by the particular network service for the first time slot, metric value MV-2 may contain a count of a number of requests successfully processed at node 102 by the particular network service for the second time slot after the first time slot, metric value MV-3 may contain a count of a number of requests successfully processed at node 102 by the particular network service for the third time slot after the second time slot, and so on. However, metric value MV-2 may not duplicate counts included in metric MV-1 and metric value MV-3 may not duplicate counts included in metric value MV-2 or MV-1, and so on.

Nonetheless, a metric value of a metric time series may be cumulative. For example, metric value MV-2 may include the count of metric value MV-1 and metric value MV-3 may include the count of metric value MV-2, and so on. The count for a particular time slot or the count since a particular time slot can be computed by subtracting one metric value from another. For example, the number of successful requests processed by the network service at node 102 for the second time slot can be computed by subtracting metric value MV-1 from metric value MV-2, and the number of successful requests processed by the network service at node 102 for the third and second time slots can be computed by subtracting metric value MV-1 from metric value MV-3, etc.

A gauge metric may be non-cumulative. For example, if metric time series 202-2 is for a gauge metric that records the current number of worker threads of a particular process at node 102, then metric value MV-7 may be the current number of work threads for the first time slot, metric value MV-8 may be the current number of worker threads for the second time slot, and so on. In this case, metric value MV-7 and metric value MV-8 may be the same value or different values. For example, the current number of worker threads may stay the same or change from the first time slot and the second time slot.

A metric value for a histogram metric may approximate a distribution being observed by representing a vector of bins of observations with counts of the number of observations for each bin like, for example, a Reimann Sum under a histogram curve. For example, the distribution being observed might be request processing latencies by a network service at a node for a time slot. When observations are being accumulated in the histogram, as the histogram accumulates more observations, the position and widths of the bins may be adjusted to redistribute the mass of the new distribution.

A histogram metric may be non-cumulative. For example, if metric time series 202-3 is for a histogram metric, the metric value MV-13 may represent vector of bins containing observations observed for a first time slot and associated with a count of the number of observations in each bin. For example, metric value MV-13 may approximate a distribution of request processing latencies of network requests processed by a network service at node 102 for the first time slot, metric value MV-14 may approximate a distribution of request processing latencies of network requests processed by the network service at node 102 for the second slot, and so on.

According to some embodiments, the vector of bins of a histogram metric value does not include the observations observed. In this case, the vector of bins represents the width and height of a Reimann approximation of the distribution curve, as opposed to percentiles. According to some embodiments, there are a maximum number of bins used in the vector which may be less than the number of observations observed for the corresponding time slot. For example, 50 bins may be used to represent the width and height of a Reimann approximation of the distribution curve for hundreds or thousands of observations during the time slot for the historical metric value. In this case, the bins may be used to reconstruct an approximate distribution curve, merging multiple distribution curves of multiple histogram metric values when aggregating the multiple histogram metric value together, and exporting the distribution curve as a vector of bins. According to some embodiments, if the number of observations observed during the time slot is less than the maximum number of bins, then the vector of bins contains the actual observations or represents percentiles for the observations.

Histogram metric values can be aggregated. For example, if metric time series 202-3 is for a histogram metric, then metric value MV-13 and metric value MV-14 can be aggregated to approximate a distribution of the observations encompassed by metric value MV-13 and metric value MV-14 for the first and second time slots. The aggregation of histogram metric values for multiple time slots can be accomplished like generating a single histogram metric value for a single time slot. In particular, a histogram metric value aggregation representing an aggregation of histogram metric values may approximate a distribution of the observations of the histogram metric values being aggregated by representing a vector of bins of the observations with counts of the number of observations for each bin like, for example, a Reimann Sum under a histogram curve. As the aggregation accumulates more of the observations of the histogram metric values being aggregated, the position and widths of the bins of the aggregation may be adjusted to redistribute the mass of the new distribution. A histogram metric value can also be downsampled in a similar manner to retain like accuracy for a time slot.

A node property value may be non-cumulative. For example, if node property time series 204-1 is for a node property that records the current operating system kernel version at node 102, then node property value NPV-1 may be the current operating system kernel version for the first time slot, node property value NPV-2 may be the current operating system kernel version for the second time slot, and so on. Node property values for a node property can remain constant for some time but can also change from time to time. For example, if the operating system kernel at node 102 is upgraded to a newer version prior to the first time slot, then node property values NPV-1 through NPV-6 may reflect the new operating system kernel version whereas node property values of node property time series 204-1 prior to the kernel upgrade may reflect the old (pre-upgraded) operating system kernel version.

In some disclosed embodiments, node collector 106 obtains new metric and node property values from processes 104 at node 102 in response to a poll from a metric collector. The poll may be the form of a network message sent from the metric collector to node collector 106 over a data communications network. In this way, node collector 102 can remain stateless with respect to when to obtain new metric and node property values from processes 104, thereby simplifying the operation and logic of node collector 106.

When polled, node collector 106 may collect new metric and node property values from processes 104 at node 102 in a variety of different ways, including a combination of different ways. For example, node collector 106 may obtain new metric and node property values from processes 104 by invoking an application programming interface (API) offered by processes 104 to node collector 106. As another example, node collector 106 may obtain new metric and node property values from processes 104 by reading the new values from log files stored at node 102. As yet another example, node collector 106 may obtain new values from shared memory areas or shared monitoring services at node 102 shared by processes 104 and node collector 106.

Metric Tags

A metric tag may be a key-value pair associated with a metric value and may be used to associate useful metadata with a metric value. A metric value provided by a node collector (e.g., node collector 106) at a node (e.g., node 102) to a metric collector (e.g., 110-1) may be associated with one or more metric tags. For example, a metric value may be associated with one or more metric tags in a metric bucket in which the metric value is provided.

The key of a metric tag may define the unique name of the metric tag which may be unique among all available metric tags. The value of a metric tag may specify metadata relevant to a metric value or a set of metric values with which the metric tag is associated.

There may be two types of metric tags: "user-defined" metric tags and "system" metric tags. The same set of system tags may be available for all metric values. User-defined tags may be metric-specific.

In some disclosed embodiments, all of the following system metric tags are available to be associated with a metric value when the metric value is provided from a node collector to a metric collector, or a subset of these system metric tags, or a superset of a subset of these system metric tags:

| System Metric Tag Name | Description of Value |
| --- | --- |
| node_id | Identifies the node collector and node (e.g., by node identifier) that reported the associated metric value. For example, the node_id may be hostname of the node. |
| _metro | Identifies the geographic locations (e.g., region or city) where the node is located. |
| _cluster | Identifies the cluster to which the node belongs. |
| _rack | Identifies the physical data center rack where the computing device corresponding to the node that reported the associated metric value is racked. |

-continued

| System Metric Tag Name | Description of Value |
| --- | --- |
| _row | Identifies the physical data center rack row where the computing device corresponding to the node that reported the associated metric value is racked. |
| _task | Identifies the process (e.g., by process identifier) at the node that reported the associated metric value. |

In the above table, the system metric tag names are merely examples and other names could be used.

Metric Storage

Metric collectors 110 may store metric and node property values obtained from nodes in storage 112. Storage 112 may be implemented as a distributed database system such as, for example, based on the Apache HBase or the Apache Cassandra distributed database systems or the like. Storage 112 may store metric and node property values in various forms and various lengths of time. The values may be stored in one or more database tables.

In per-node raw table(s) 112-1, metric and node property values reported by node collectors 106 to metric collectors 110 may be stored in raw form (e.g., in a non-downsampled form) on a node by node basis. For example, an entry in per-node raw table(s) 112-1 may associate a node identifier with one or more metric time series and one or more node property times series received for that node.

Likewise, per-process raw table(s) 112-3 may store metric and node property values reported by node collectors 106 to metric collectors 110 in raw form on a process by process basis. For example, an entry in per-process raw table(s) 112-3 may associate a node identifier and a process identifier, and possibly other information to disambiguate that process at that node (e.g., an increasing event identifier), with one or more metric time series and one or more node property times series received for that process at that node.

Given a high frequency with which metric buckets are collected from nodes in system 100 (e.g., on the order of millions or billions of metric values per minutes), per-node raw table(s) 112-1 and per-process raw table(s) 112-3 may retain only the most recent metric time series and node property time series for a relatively short period of time such as, for example, the past thirty days.

A tag values fresh table 112-5 may store all unique tag values for all tags received by metric collectors 110 during a period of time such as, for example, the past two weeks. Such set of unique tag values may be used for a variety of purposes including, for example, to provide suggested autocomplete functionality for tag values of tags users express in query statements.

Metric downsampler 114 may read and downsample the raw metric time series and the raw node-property times series in per-node raw table(s) 112-1 and store downsampled time series in per-node downsampled table(s) 112-2. Metric downsampler 114 may do likewise for per-process raw table(s) 112-3 to populate per-process downsampled table(s) 112-4. Metric downsampler 114 may be implemented by multiple nodes or multiple processes that downsample time series in storage 112 concurrently (e.g., in parallel) so as to increase the downsampling throughput. In this case, a node or process of metric downsampler 114 may downsample a portion or a partition of all time series in storage 112. If greater downsampling throughput is needed, then metric downsampler 114 may be horizontally scaled by adding more nodes or processes that perform downsampling.

A time series can be downsampled by metric downsampler 114 at multiple different time intervals such as, for example, three minutes, thirty minutes, one day, one week, one month, etc. Downsampling generally involves representing multiple values for multiple different corresponding time periods with a single value for a larger time period that encompasses all of the smaller time periods of the downsampled values. For example, the multiple metric values may be summed together, averaged, or otherwise aggregated together to produce the single value.

When downsampling a series of metric values for a counter type metric for a time interval, the metric values can be aggregated (e.g., summed or averaged) to produce a downsampled metric value for the time interval. When downsampling a series of metric values for a gauge type metric for an interval, one of the metric values in the series can be selected as the downsampled metric value for the time interval. For example, the earliest metric value in the series, the latest metric value in the series, or the most frequent metric value in the series may be selected as the downsampled gauge metric value for the time interval. When downsampling a series of metric values for a histogram type metric for a time interval, the metric values can be aggregated as described above for histograms to produce a downsampled histogram metric value for the time interval. Downsampling a series of node property values for a time interval can be performed similar to downsampling a series of gauge metric values for a time interval. For example, the earliest node property value in the series, the latest node property value in the series, or the most frequent node property value in the series may be selected as the downsampled node property metric value for the time interval.

Depending on the length of the downsampling time interval, downsampled time series in per-node downsampled table(s) 112-2 and per-process downsampled table(s) 112-4 can be retained in storage 112 for a period of time. The longer the length of the downsampling time interval, the fewer number of metric values that may need to be stored in storage 112 to cover the same period of time. As a result, the longer the length of the downsampling time interval, the longer the downsampled time series may be retained in storage 112. For example, a downsampled time series where each time series value represents a day in time may be retained longer in storage 112 than a downsampled time series where each time series values represents an hour in time. This strategy may be adopted to conserve consumption of storage 112 resources on the premise that as time goes on, the need for storing time series at fine-grained time intervals for monitoring and alerting becomes less, as most monitoring and alerting issues need to be addressed as soon as possible (e.g., within minutes, hours, or days) to maintain an adequate level of service of the large-scale computer application. Nonetheless, retaining time series at longer time intervals for an extended period of time may be useful for historical auditing, historical analysis, compliance, and other purposes.

Storage 112 may contain table(s) 112-6 of metric names and tag names. Table(s) 112-6 may associate metric names and tag names with respective compact identifiers. The metric names and tags names may be character string data that represent a descriptive name of the metrics and tags. The compact identifiers may require fewer data bytes or data bits of storage to represent than the character string data and may be opaque identifiers that do not descriptively identify the associated metrics and tags. The compact identifiers may be used in metric buckets to refer to metrics and tags. In this way, the metric buckets consume less network bandwidth than if the metric buckets referred to metrics and tags by their descriptive character string values. For example, compact identifiers may be numerical identifiers, aliases, bit sequences, or other relatively short bit or byte sequences that consume less computer storage and less network bandwidth than the character string identifiers. Components (e.g., query cache 116, node collector 106, metric collectors 110, etc.) in system 100 may retrieve from storage 112 and use data in metric and tag name table(s) 112-6 to map compact identifiers to character string names for metrics and tags, and to map character string names for metrics and tags to their associated compact identifiers. While in some disclosed embodiments metric and tag name table(s) 112-6 in storage 112 contains mappings between metric and tag names and compact identifiers therefor, metric and tag name table(s) 112-6 in storage 112 may also contain mappings between node property names and compact identifiers therefor.

According to some disclosed embodiments, metric collectors 110 poll node collectors at nodes in system 100 every ten seconds, approximately, for new metrics and node property values. Metric collectors 110 receiving new metric and node property time series values from node collectors at nodes in system 100 may buffer the time series values for a period of time (e.g., four minutes) before flushing the time series values to storage 112. By doing so, the write load on the distributed database system that implements storage 112 can be reduced.

Metric Bucket Streaming

According to some disclosed embodiments, metric collectors 110 stream metric buckets received from node collectors 106 at nodes 102 in system 100 to query cache cluster 118. The metric buckets may be streamed over a data communications network (e.g., an IP network) connecting the metric collectors 110 to the query cache cluster 118. Metric collectors 110 may buffer metric buckets obtained from node collectors for a period of time (e.g., a few minutes) before sending the metric buckets onto query cache cluster 118.

In some disclosed embodiments, instead of metric collectors 110 receiving metric buckets from node collectors 106 at nodes 102 in system 100, metric collectors 110 receive time series data from node collectors at nodes in system 100. Metric collectors 110 then collect the received time series data into metric buckets which are then sent to query cache cluster 118. Metric collectors 110 may buffer time series data received from a node collector (e.g., 106) at a node (e.g., 102) for a period of time (e.g., a few minutes) in order to ensure it has received all time series data from the node collector at the node that should be included in a metric bucket for a particular time slot before sending the metric bucket to query cache cluster 118.

Query Cache Cluster

According to some disclosed embodiments, query cache cluster 118 is provided to process queries, including topology join queries, submitted to it by query/API server cluster 122. Both query cache cluster 118 and query/API server cluster 122 may be implemented by one or more computing nodes. Both query cache cluster 118 and query/API server cluster 122 may be scaled horizontally by adding more computing nodes to the cluster. Query cache cluster 118 may be a cluster of query caches 116. Query/API server cluster 122 may be a cluster of query/API servers 120 (e.g., web/application servers).

According to some disclosed embodiments, query cache 116 is for a particular "target" query submitted by query/API server cluster 122. Query cache cluster 118 may have a query cache (e.g., query cache 116) for each live target query submitted by query/API server cluster 122. A live target query may be one that is periodically submitted by GUI 128 or alert watcher 124 to query/API server cluster 122 over a sliding window of time that involves the same target metric and/or the same target node property for each submission but that is associated with a sliding target time window.

For example, a user may use GUI 128 (e.g., a web browser window) to submit the following topology-join query (or a request that the following topology-join query be submitted) to query/API server cluster 122 every thirty seconds for a five-minute sliding window:

request_latency_ms[_p,@kernel_version]
   @node{_task="vortex_query",_p="p95"}

Each submission of this query (or request to submit) from GUI 128 to query/API server cluster 122 may in turn correspond to a submission of the query by query/API server cluster 122 to query cache cluster 118. Upon receiving the query, query cache cluster 118 may determine results for the query from the query cache (e.g., 116) for the query and return those query results to query/API server cluster 122 which then, in turn, are returned to GUI 128 for presentation there. A similar query processing flow may occur for alert watcher 124 except instead of presenting the query results in a graphical user interface (or in addition to presenting the results in a graphical user interface), alert watcher 124 may compare the query results to alert thresholds to determine whether a person on pager duty 126 should be notified (e.g., by text message, automated phone call, e-mail, etc.).

Figure 3:
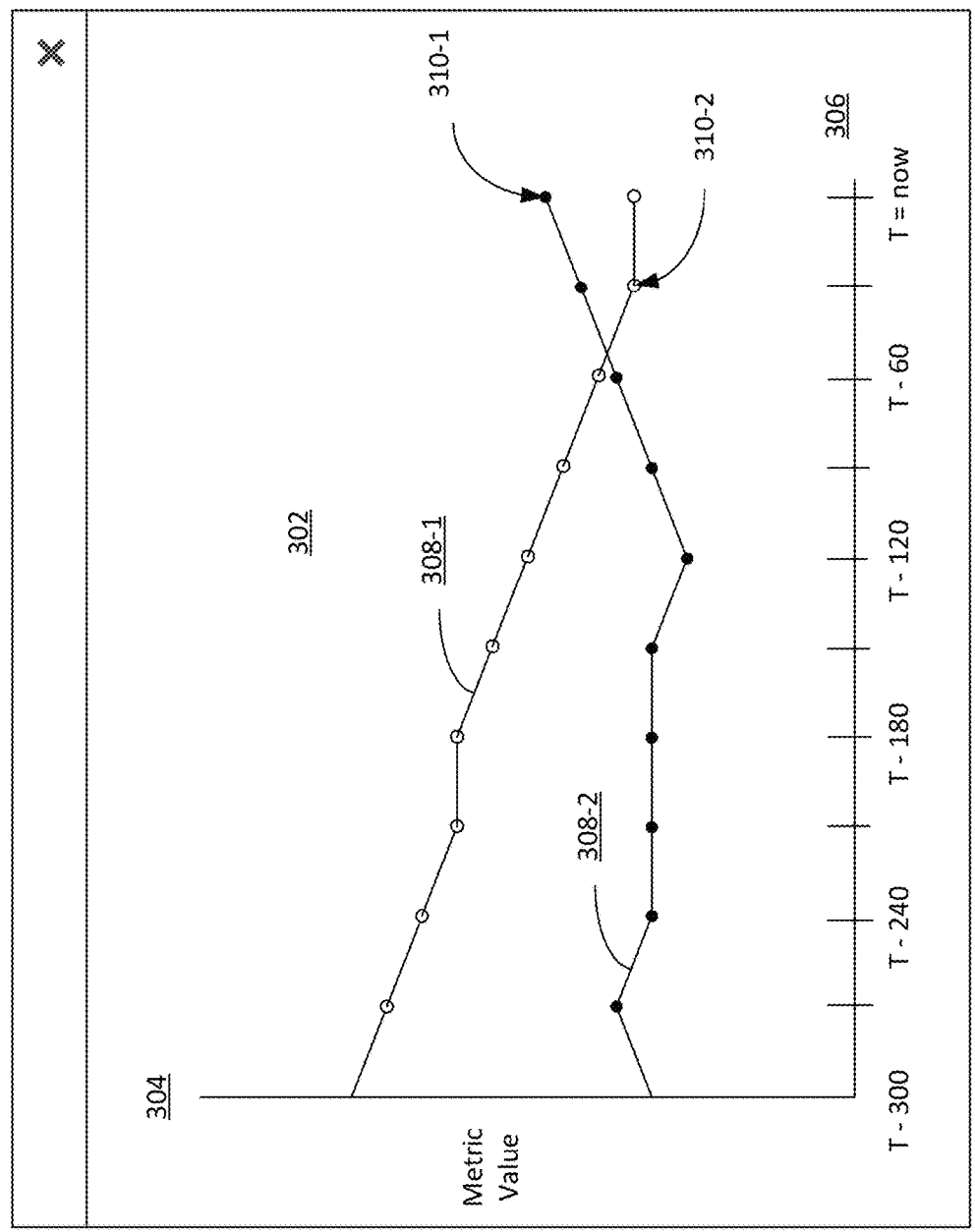
FIG. 3 illustrates a graphical user interface that charts a target metric based on query results, according to some disclosed embodiments.

For example, FIG. 3 illustrates example graphical user interface (GUI) 300, according to some disclosed embodiments. GUI 300 includes chart 302 having y-axis 304, x-axis 306, first metric time series 308-1, and second metric time series 308-2. Chart 302 may plot results of a query or queries submitted by query/API server cluster 122 to query cache cluster 118 on a regular query submission interval such as every thirty seconds or other user-selected or user-configured query submission interval. Each submission of the query or queries may correspond to a sliding window of time for which query results are requested such as, for example, the past five minutes, or other user-selected, or user-configured time range. For example, chart 302 may be associated with a query or queries that are submitted every thirty seconds for the past five minutes.

Y-axis 304 may correspond to a scale for metric values and X-axis 306 may correspond to a scale for time. The scale for metric values of y-axis 304 may depend on the target metric of the query or queries submitted. For example, Y-axis 304 may represent request processing latency of a particular network service (e.g., a SQL service) running on multiple nodes in system 100. The scale for time of x-axis 306 may depend on the query submission interval. For example, each charted point of first metric time series 308-1 and second metric time series 308-2 may be charted based on a thirty second query submission interval (or other query submission interval). For example, chart point 310-1 may be the most recent chart point of metric time series 308-2 and chart point 310-2 may have been charted thirty seconds prior to chart point 310-1.

First time series 308-1 and second time series 308-2 may be charted based on results returned in response to submission of the query every thirty seconds (or other user-selected or otherwise user-selected query submission interval) from query/API server cluster 122 to query cache cluster 118. Each such submission may be associated with a sliding window of time. For example, each query submission may request results for the past five minutes. For example, chart point 310-1 may represent a metric value of first metric time series 308-1 where the metric value reflects the past five minutes at time T (i.e., T to T minus 300 seconds) of activity at corresponding nodes. Likewise, chart point 310-2 may represent a metric value of second metric time series 308-2 where the metric value reflects the past five minutes of activity at corresponding nodes.

If the query or queries submitted involve a topology-join, then each metric time series 308-1 may correspond to a distinct node property value. For example, if the query or queries submitted request the $95^{th}$ percentile request processing latency of a particular network service running on nodes in system 100 broken down by operating system kernel version or other node property of the nodes in system 100 running the particular network service, then metric time series 308-1 may chart the $95^{th}$ percentile request processing latency of the particular network service on nodes running a first operating system kernel version and metric time series 308-2 may chart the 95th percentile request processing latency of the particular network service on nodes running a second (different) operating system kernel version.

According to some disclosed embodiments, query cache 116 allows results for a query, including a topology join query, submitted from query/API server cluster 122 to be determined very quickly (e.g., in milliseconds). This is because the results may already be cached in query cache 116 when the query is submitted to query cache cluster 118.

Query cache 116 may be updated with new data as metric buckets are streamed from metric collectors 110 to query cache cluster 118. This keeps query cache 116 up-to-date for future queries such as those associated with auto-refresh dashboard graphical user interfaces (e.g., such as the auto-refresh dashboard of FIG. 3) and alerts, both of which may require the latest metric data every few seconds (e.g., every thirty seconds).

Metric Streaming

Figure 4:
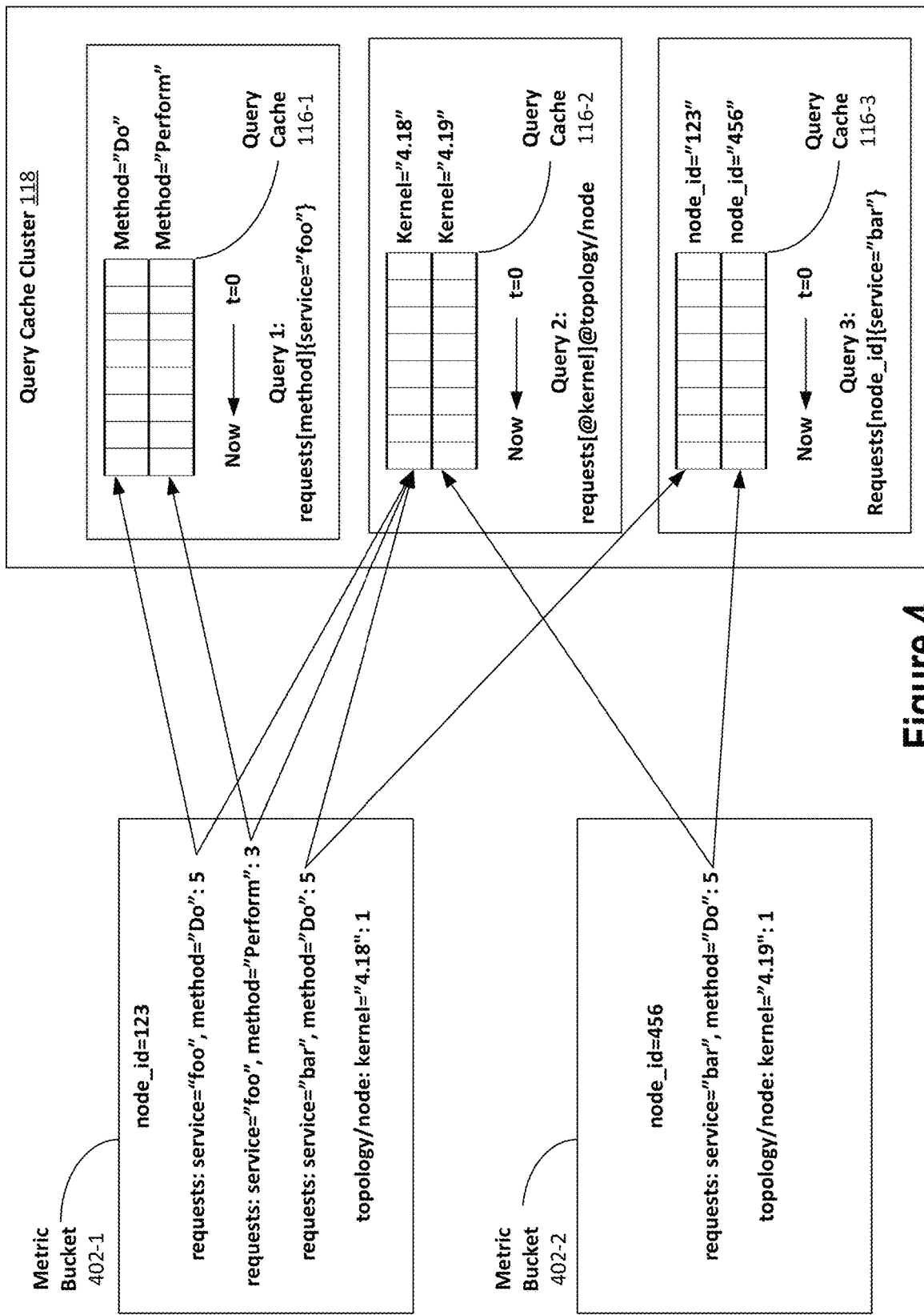
FIG. 4 illustrates streaming of metric buckets from metric collectors to a query cache cluster, according to some disclosed embodiments.

FIG. 4 illustrates metric streaming of metric buckets 402-1 and 402-2 from metric collectors 110 to query cache cluster 118, according to some disclosed embodiments. As shown, metric bucket 402-1 contains three metric values, possibly among other metric values, and one node property value, possibly among other node property values. As shown, metric bucket 402-2 contains one metric value, possibly among other metric values, and one node property value, possibly among other node property values.

Metric bucket 402-1 collects metric values and node property values from a particular node (e.g., a node with node identifier "123") and Metric bucket 402-2 collects metric values and node property values from another particular node (e.g., a node with node identifier "456"). In this example, metric buckets 402-1 and 402-2 may be for the same time slot such as, for example, the same ten second time slot.

Metric bucket 402-1 has three metric values for a "requests" metric. Each metric value counts a number of requests to invoke a corresponding method of a corresponding network service processed by the corresponding network service at node "123" for the time slot. Each of the three metric values are associated in metric bucket 402-1 with two user-defined metric tags. One of the user-defined tags is named "service" and identifies the corresponding network service to which the associated metric value pertains. The other of the user-defined tags is named "method" and identifies the corresponding method of the network service invoked by the requests counted by the associated metric value. For example, the metric values of metric bucket 402-1 specify that five requests for the "Do" method of the "foo" network service were processed by the "foo" network service at node "123" for the time slot, three requests for the "Perform" method of the "foo" network service were processed by the "foo" network service at node "123" for the time slot, and five requests for the "Do" method of the "bar" network service were processed by the "bar" network service at node "123" for the time slot. Metric bucket 402-1 also contains the "4.18" node property value for the "kernel" node property. This node property values specifies that the operating system kernel version at node "123" for the time slot is "4.18". Because the node property value is contained in the same metric bucket (i.e., 402-1) as the three metric values, it can be determined that the three metric values and the node property value are for the same node (i.e., node "123") and for the same time slot. It should be noted that metric bucket 402-1 may be associated with a timestamp (not shown) that indicates or specifies the time slot.

Similarly, metric bucket 402-2 has a metric value for the "requests" metric. The metric value counts the number of requests to invoke a corresponding method of a corresponding network service processed by the corresponding network service at node "456" for the time slot. The metric value is associated in metric bucket 402-2 with the "service" and "method" user-defined tags. The metric value specifies that five requests for the "Do" method of the "bar" network service were processed by the "bar" network service at node "456" for the time slot. Metric bucket 402-2 also contains the "4.19" node property value for the "kernel" node property. The node property value specifies that the operating kernel version at node "456" for the time slot is "4.19". Because the node property value is contained in the same metric bucket (i.e., 402-2) as the metric value, it can be determined that the metric value and the node property value are for the same node (i.e., node "456") and for the same time slot. It should be noted that metric bucket 402-2 may be associated with a timestamp (not shown) that indicates or specifies the time slot.

While in the example of FIG. 4 the actual metric, node property, and tag names are used for the purpose of providing a clear example, the names in the metric buckets may be replaced with compact identifiers as discussed above in order to conserve network bandwidth of the data communications network used to send the metric buckets from metric collectors 110 to query cache cluster 118.

Query cache cluster 118 may receive multiple streams of metric buckets from metric collectors 110 where each stream corresponds to a node in system 100. Metric values in the metric buckets may be aggregated by distinct node property values in query caches for queries as shown in FIG. 4. In this example, there are three queries and three corresponding query caches 116-1, 116-2, and 116-3, respectively. In some disclosed embodiments, query cache cluster 118 may have tens or hundreds of query caches at a given time. In this example, Query 1 asks for the number of requests processed by the "foo" service at nodes in system 100 running the "foo" service broken down by (grouped by) service method requested. Query 2 is a topology join query and asks for the number of requests processed at nodes in system 100 (regardless of service) broken down by (grouped by) operating system kernel version. Query 3 asks for the number of requests processed by the "bar" service at nodes in system 100 (regardless of service) running the "bar" service broken down by (grouped by) node identifier. Although not shown in FIG. 4, when each query is submitted from query/API server cluster 122 to query cache cluster 118, it may be associated with a target window of time, which is typically close to a current time (current as when the query is submitted) and is typically a matter of seconds or minutes in length. For example, the target window of time may be the past thirty seconds, the past five minutes, the past fifteen minutes, etc. Different query submissions may be associated with different target windows of time and there is no requirement that all target windows of time associated with query submissions be the same length.

According to some disclosed embodiments, a query cache for a query includes a metric time-series for each distinct metric value or node property value received in metric buckets that are relevant to the query. For example, both metric buckets 402-1 and 402-2 are relevant to Query 2 because they include "request" metric values and because they include "kernel" node property values that are relevant to Query 2. Accordingly, there is one metric time series in query cache 116-2 for distinct "kernel" node property value "4.18" included in metric bucket 402-1 (and possibly other metric buckets received by query cache cluster 118) and another metric time series in query cache 116-2 for distinct "kernel" node property value "4.19" included in metric bucket 402-2 (and possibly other metric buckets received by query cache cluster 118).

According to some disclosed embodiments, a metric time series of a query cache aggregates metric values from multiple nodes for a distinct node property value on a time slot basis. For example, one metric time series of query cache 116-2 aggregates metric values from multiple nodes for "kernel" node property value "4.18" on a time slot basis and another metric time series of query cache 116-2 aggregates metric values from multiple nodes for "kernel" node property value "4.19" on a time slot basis.

A time slot of the metric time series of a query cache can be the same length in time or a greater length in time as the time slot of a metric bucket. As a result, each metric bucket can be mapped by the time slot of the metric bucket to at most one time slot of a metric time series of a query cache. For example, if each time slot of the metric time series of query cache 116-2 corresponds to a thirty-second-time slot and metric buckets 402-1 and 402-2 each correspond to a ten second time slot, then metric bucket 402-1 can be mapped to one corresponding time slot of a metric time series of query cache 116-2 by the thirty-second time slot that contains the ten-second time slot of the metric bucket. It should be noted that there is no requirement that each metric time series have time slots of the same duration. For example, one metric time series of a query cache may have thirty second time slots and another metric time series of the query cache may have one-minute time slots. There is also no requirement that each time slot of a metric time series of a query cache be the same duration. For example, some time slots of a metric time series of a query cache can be thirty-seconds in duration and other time slots of the metric time series can be one minute in duration.

A metric time series of a query cache may aggregate metric values from multiple nodes across a sliding window of time of a predetermined, user selected, user configured, automatically determined, or dynamically and automatically determined length. For example, the metric time series of query cache 116-2 may aggregate metric values across a sliding window of 24 hours (e.g., the past 24 hours) or other length of time.

A metric time series of a query cache may be stored in volatile computer memory of a node of query cache cluster 118 for fast read and write access. It should be noted that this do not prohibit a metric time series (or a portion thereof) of a query cache from being stored in non-volatile computer memory such as, for example, as a result of virtual memory management. A metric time series may be implemented using a suitable computer data structure such as, for example, a circular buffer (queue) having entries corresponding to time slots where each entry stores a metric value. Reference herein to an "entry" of a metric time series of a query cache refers to an entry, slot, or address of a data structure stored in computer storage media that represents the metric time series. The entry of a metric time series has a corresponding time slot which may change over time (e.g., every 24 hours) as older aggregated metric values are expelled from the metric time series of the query cache to make room for newer metric values.

A metric bucket streamed from metric collectors 110 to query cache cluster 118 can be "routed" at query cache cluster 118 to one or more query caches to which the metric bucket is relevant. The metric bucket may be routed based on the metric values and the node property values contained in the metric bucket. For example, query cache cluster 118 can determine that metric bucket 402-1 is relevant to Query 1 because metric bucket 402-1 contains "requests" metric values associated with "method" tags and "service" tags that are associated with the tag value "foo." Query cache cluster 118 can determine that metric buckets 402-1 and 402-2 are relevant to Query 2 because each bucket contains "requests" metric values and a "kernel" node property value. Query cache cluster 118 can determine that metric buckets 402-1 and 402-2 are relevant to Query 3 because metric each contains "requests" metric values and "service" tags that are associated with the tag value "bar".

An entry of a metric time series of a query cache may aggregate multiple metric values from multiple metric buckets including multiple metric buckets from multiple nodes. For example, as shown, the metric value 5 of metric bucket 402-2 can be aggregated with (e.g., added to) any existing metric value in the entry of the metric time series of query cache 116-2 for "kernel" node property value "4.19." If there is no existing metric value in the entry, then the metric value 5 of metric bucket 402-2 can be set as the initial value in the entry.

The corresponding time slot of the metric time series to which the metric value is added may be determined based on the time slot for metric bucket 402-2. For example, the entry can be determined based on the time slot for metric bucket 402-2 falling completely within or exactly corresponding to the time slot for the entry. It is possible for a time slot for a metric bucket to overlap the time slots of multiple consecutive entries of a metric time series in a query cache. In this case, the metric value of the metric bucket can be distributed over the multiple entries according to a distribution of the proportional overlap of the time slots of the entries by the time slot of the metric bucket. Alternatively, the metric value of the metric bucket can be allocated to a selected one of the multiple entries such as, for example, the entry with the most recent time slot.

FIG. 4 provides an example of aggregating multiple metric values from metric bucket 402-1 into an entry of a metric time series corresponding to a time slot of metric bucket 402-1. In particular, all three metric values 5, 3, and 5 of metric bucket 402-1 are aggregated together (summed together) in an entry of the metric time series of query cache 116-2 for "kernel" node property value "4.18." For example, if there is an existing metric value X in the entry when the metric values are aggregated in the entry, then the resulting metric value in the entry may be X+5+3+5. If there is no existing value, then the resulting metric value in the entry may be 5+3+5.

As illustrated with the example of FIG. 4, multiple streams of multiple metric buckets from multiple nodes in system 100 can be aggregated in query caches where each query cache corresponds to a query submitted from query/API server cluster 122 to query cache cluster 118. For example, each query submitted may correspond to an active graphical user interface dashboard in GUI 128 or an active alert configured with alert watcher 124.

A query may be repeatedly submitted from query/API server cluster 122 to query cache cluster 118. For example, the query may be submitted every thirty seconds. Each time the query is submitted it may be submitted with a range in time for which query results are requested. For example, each time the query is submitted it may request results for a range in time spanning a current time (relative to the time to the query submission) and a historical time (e.g., five minutes ago relative to the current time). For a given query submission, query cache cluster 118 can efficiently compute the query results to return for the query submission from the aggregated metric values in the query cache for the query.

For example, for a submission of Query 2 of FIG. 4, query cache cluster 118 may compute a metric value from aggregated metric values for each distinct node property value of query cache 116-2 metric values. For example, query cache cluster 118 may compute a metric value for "kernel" node property value "4.18" and another metric value for "kernel" node property value "4.19". Each such metric value may be computed by aggregating (e.g., summing) metric values in the entries of the corresponding metric time series of query cache 116-2 that are within the target time period of the query submission. For example, if the metric time series for "kernel" node property value "4.18" covers a 24 hour sliding window of time where each entry of the metric time series corresponds to a thirty second time slot within the 24 hour sliding window of time and the target time period for a particular submission of Query 2 is a five minute period within the current 24 hour sliding window, then the metric value to return as a query result for the query submission can be computed by summing the metric values within 10 consecutive entries of the metric time series that correspond to the five minute period. Note that this relatively simple computation can be performed very quickly (e.g., in a few milliseconds) by query cache cluster 118 in response to receiving a query submission of Query 2, especially if the entries are stored in volatile memory. It should also be noted that since metric values from multiple nodes are pre-aggregated by distinct node property values prior to the query submission, this aggregation need not be performed in response to receiving a query submission, thereby improving the query submission response time/latency of query cache cluster 118.

Metric time series values in a query cache can also be downsampled and results to query submissions can be determined by query cache cluster 118 from downsampled metric time series values in the query cache. The downsampling can occur like the downsampling performed by metric downsampler 114 on metric time series in storage 112. For example, metric values in metric buckets 402-1 and 402-2 can be initially allocated to an initial level of metric time series having thirty second entries. Then, query cache cluster 118 can aggregate multiple entries of a metric time series in the initial level (e.g., ten thirty second entries) in a single entry in a metric time series in a second level of metric time series having entries with a time resolution of minutes (e.g., five minutes). This can continue for further downsampling levels with greater time resolutions per entry. Downsampling can occur on regular intervals such as, for example, corresponding to the time resolution of the entries on the downsampled metric time series. For example, for a downsampled metric time series with five-minute time resolution for entries, metric time series from the level below can be downsampled every five minutes. By storing downsampled metric time series in a query cache for a query, it may be possible to provide results to a submission of the query without needing to aggregate metric time series entries because there is a single metric time series entry that contains the metric value requested for the time period of the query submission. For example, the metric value requested can simply be read from the single entry in volatile memory. Even if the query result for a query submission is not available from a single downsampled metric time series entry, it may be computed by aggregating fewer downsampled metric time series entries than would be needed if the query result were computed from entries in the initial metric time series level of the query cache. Also, since downsampled metric time series require less computer storage media to store than the metric time series of the initial level, downsampled metric time series may cover a longer range in time. For example, a metric time series in the initial level of a query cache may cover the past 24 hours while a downsampled metric time series in a downsampled level may cover the past week, depending on the time resolution of the entries in the downsampled metric time series. This also allows computing results to a query for a time period that is past or at least partially beyond the time period covered by the metric time series in the initial level without having to process the query against storage 112. In other words, the query can be answered from a query cache without having to access storage 112, which can improve the query processing time/latency. For example, a query associated with a requested time period of the past week or more than a day ago may be able to be answered from downsampled metric time series of a query cache for the query even if the metric time series of the initial level of the query cache covers only the past 24 hours.

Metric Bloom Filters

Depending on the queries submitted from query/API server cluster 122 to query cache cluster 118, different query caches may be maintained in query cache cluster 118 at different times. And the queries submitted from query/API server cluster 112 to query cache cluster 118 may depend on the current metric dashboard presented in GUI 128 and the current alerts configured at alert watcher 124.

During operation of system 100, metric collectors 110 may continually stream metric buckets to query cache cluster 118. However, query cache cluster 118 need only receive metric values that are relevant to the query caches currently established in query cache cluster 118. Metric values that are not relevant to a currently established query cache in query cache cluster 118 do not need to be streamed by metric collectors 110 to query cache cluster 118.

To reduce consumption of computing and network resources by streaming of metric values from metric collectors 110 to query cache cluster 118 that are not relevant to any query cache currently established in query cache cluster 118, query cache cluster 118 may register a bloom filter or bloom filters with metric collectors 110. For example, query cache cluster 118 may register a bloom filter with metric collectors 110 each time a new query cache is established in query cache cluster 118. The bloom filter registered may indicate a set of metrics relevant to the one or more query caches currently established at query cache cluster 118. As is the nature of bloom filters, the set of metrics indicated by a registered bloom filter may be overinclusive. That is, the set of metrics may indicate metrics that are not actually relevant to a query cache currently established in query cache cluster 118. However, a bloom filter registered for one or more query caches will never be underinclusive with respect to those one or more query caches for which the bloom filter is registered with metric collectors 110.

The hash functions used for a bloom filter may set indices in the bloom filter based on identifiers of metrics that relevant to one or more query caches currently established at query cache cluster 118. When determining which metric values to keep in a metric bucket streamed to query cache cluster 118, metric collectors 110 may apply the hash functions to the identifiers of the metrics of the metric values to determine which of the metrics are set in the bloom filter or bloom filters currently registered. Metric collectors 110 may omit or remove metric values from the metric bucket streamed to cluster 118 for metrics that are not set in the current bloom filter(s) registered. In this way, metric values that are not relevant to any query cache currently established at query cache cluster 118 are not streamed to query cache cluster 118, thereby conserving network and computing resources. The metric bucket may be discarded altogether and not streamed to query cache cluster 118 from metric collectors 110 if none of the metrics of the metric values in the metric bucket are set in the current bloom filter(s) registered.

Example Process

FIG. 5 depicts example process 500 for processing a topology join query, according to some disclosed embodiments, Process 500 may be performed by query cache cluster 118 of system 100, for example. Query cache cluster 118 may be implemented by one or more computing nodes configured with software and/or hardware configured to perform process 500.

At operation 510, a query cache (e.g., 116) for the topology join query is established. The topology join query may specify a target metric and a target node property by which to group the target metric. For example, the following query statement of an example topology join query specifies a "requests" target metric and a "kernel" target node property by which to group the "requests" target metric: requests [@kernel]@topology/node. However, the topology join query for which the query cache is established at operation 510 is not limited to any particular target metric or any particular type of target metric, or any particular node property. For example, the topology join query might specify another counter-type metric or specify a histogram-type metric. In addition, or alternatively, instead of a "kernel" node property, the topology join query might specify another target node property such as, for example, any of owner name, project name, deployment name, application name, feature name, package name, configuration revision, hardware class, cluster identifier, pocket identifier, zone identifier, cell identifier, or any other attribute or property of nodes in a distributed computing system which can be sampled at the nodes and by which it is useful to group a set of same nodes together (i.e., a set of nodes having the same first value for the target node property) for the purpose of comparing metric times series from the set of nodes to metric times series from another set of same nodes (i.e., a set of nodes have the same second value for the target node property, where the same first value is different from the same second value).

Cluster 118 may establish the query cache for the topology join query at a computing node of cluster 118. Cluster 118 may establish the query cache for the topology join-query at the computing node of cluster 118 in response to cluster 118 receiving an initial or first submission of the topology-join query from query/API server cluster 122. Alternatively, cluster 118 may establish the query cache for the topology-join query at the computing node of cluster 118 in anticipation of receiving an initial or first submission of the topology join query from query/API server cluster 122. For example, cluster 118 may establish the query cache for the topology-join query at the computing node of cluster 118 in response to user selected or input command to establish the query cache for the topology-join query at the computing node of cluster 118.

Establishing the query cache may include instantiating a suitable data structure in volatile memory of the computing node of cluster 118. An instantiated data structure may store a metric time series for a respective distinct node property value. For example, the data structure instantiated for a metric time series can be a circular queue, a linked list, an array, or the like. A metric time series may cover a sliding window in time such as, for example, a past number of minutes, hours, days, or other range in time. An entry of the metric time series may correspond to a respective time slot in the sliding window in time. The length of the respective time slot may cover a portion of the sliding window in time such as, for example, 30 seconds, one minute, five minutes, 1 hour, 4 hours, etc. within the sliding window in time. The metric time series may have multiple such entries covering the entire sliding window in time. For example, if the length of the sliding window in time is 24 hours, and the length of each time slot is 30 seconds, then the metric time series may have 2,880 entries. The sliding window in time may slide forward in time on a regular interval. The length of the interval can be equal to the length of a time slot. For example, the sliding window in time may slide forward every 30 seconds. The amount the sliding window in time slides forward in time may be equal to the length of a time slot. For example, the sliding window in time may slide forward 30 seconds in time every 30 seconds. When sliding forward in time, the entry corresponding to the oldest time slot may be reused as the entry for the most recent time slot covered by the sliding window after sliding forward. When being reused, the metric value in the entry for the oldest time slot can be discarded or downsampled.

According to some embodiments, establishing the query cache for the topology join query may include loading historical metric values relevant to the topology join query from storage 112. For example, if the sliding window in time covers the past 24 hours, then metric values covering a past 24-hour period relevant to the topology-join query may be loaded from storage 112 into the query cache. In addition, relevant unflushed metric values at metric collectors 110 may be loaded into the query cache as these unflushed metric values may not have been written to storage 112 yet.

In addition, establishing the query cache for the topology join query may include cluster 118 registering an intent to receive streamed metric buckets for the target metric with metric collectors 110. Such registration may include cluster 118 sending a bloom filter to metric collectors 110. The bloom filter sent may indicate that cluster 118 intends to receive metric values for the target metric of the topology-join query. To do so, cluster 118 may apply hash functions to an identifier (e.g., a name) of the target metric. Cluster 118 may set indices in the bloom filter based on the outputs of the hash functions applied to the target metric identifier. The set indices may indicate that cluster 118 intends to receive metric values for the target metric of the topology join query. Cluster 118 may also do this for other target metrics of other queries for which query caches in cluster 118 are being established or have been established such that multiple sets of indices are set in the bloom filter for multiple different target metrics of different queries. Metric collectors 110, when streaming metric buckets to query cache cluster 118, may filter out metric values for metrics from the metric buckets that are not intended to be received by cluster 118 according to the registered bloom filter(s). By doing so, network bandwidth between metric collectors 110 and cluster 118 is conserved, as well as computing resources at cluster 118 which are able to receive and process metric buckets with fewer metric values because of the filtering. To determine whether a given metric value of a given metric bucket should be filtered, the hash functions of the bloom filter(s) may be applied to an identifier of the metric of the given metric value and the outputs of the hash functions used to determine if corresponding indices are set in the bloom filter(s). If the corresponding indices are set (e.g., set to 1), then the metric value may be retained in the metric bucket streamed to cluster 118. On the other hand, if one or more of the corresponding indices are not set (e.g., set to 0) then the metric value may be removed from the metric bucket before the metric bucket is streamed to cluster 118.

At operation 520, metric time series values relevant to the topology-join query are aggregated in the query cache by distinct node property time series values relevant to the topology join query in a historically accurate manner. Once the query cache is established for the topology join query, cluster 118 may receive a stream of metric buckets from metric collectors 110. Each of the metric buckets streamed to cluster 118 may contain metric values and node property values collected metric collectors 110 from nodes in system 110. Each of the metric buckets streamed to cluster 118 may contain metric values and node property values pertaining to one corresponding node in system 100. Each of the metric buckets streamed to cluster 118 may contain an identifier of the node it pertains to. Each of the metric buckets stream to cluster 118 may corresponding to a time slot. Each of the metric buckets streamed to cluster 118 may contain a timestamp or timestamps indicating the time slot to which it corresponds.

A series of metric buckets pertaining to the same node in system 100 streamed to cluster 118 may contain multiple metric values for the same metric over the series of metric buckets. The multiple metric values are a metric time series for the metric from the node. Likewise, a series of metric buckets pertaining to the same node in system 100 stream to cluster 118 may contain multiple node property values for the same node property over the series of metric buckets. The multiple node property values are a node property time series for the node property from the node.

Cluster 118 may determine if a streamed metric bucket is relevant to the query cache for the topology-join query if the metric bucket contains a metric value for the target metric of the topology join query and the metric bucket contains a node property value for the target node property. In this case, cluster 118 may aggregate the metric value in the metric bucket in the metric time series for the node property value of the query cache. In particular, cluster 118 may select a "target" entry in the metric time series for the node property value in which to aggregate the metric value of the metric bucket. This selection may be based on the time slot of an entry in the metric time series for the node property value and the time slot of the metric bucket. For example, if the time slot of the metric bucket equals or falls within the time slot of the entry, then the entry may be selected as the target entry into which the aggregate the metric value. Alternatively, if the time slot of the metric bucket spans the time slots of multiple entries of the metric time series, then one of the multiple entries may be selected as the target entry (e.g., the entry of the multiple entries for the most recent time slot or the entry of the multiple entries for the least recent time slot). Alternatively, the metric value can be distributed over the multiple entries either equally or approximately equal or in proportion to the extent of overlap of the time slot of the metric bucket of the time slots of each of the multiple entries.

When aggregating a metric value of a metric bucket into an entry of a metric time series of the query cache, there may be an existing metric value in the entry that represents an aggregation of previously aggregated metric values. In this case, the metric value of the metric bucket may be aggregated with the existing metric value and the result stored in the entry. The aggregation may be a sum or an average or other aggregation operation involving the metric value of the metric bucket and the existing metric value. In the case, where there is no an existing metric value in the entry, then the metric value of the metric bucket may be stored in the entry as the initial metric value of the entry. In this way, multiple metric values of multiple metric buckets pertaining to different nodes for the same time slot and having the same value for the target node property may be aggregated into a corresponding entry of the metric time series of the query cache for the target node property value.

Because metric values of the target metric contained metric buckets are aggregated in metric time series entries of the query cache based on correspondence of time slots of the metric buckets and time slots of the entries, the aggregation is historically accurate. In particular, a metric value in a metric bucket for the target metric is aggregated in the metric time series of the query cache for the target node property value contained in the metric bucket and aggregated in an entry of the metric time series having a time slot corresponding to the time slot of the metric bucket. In this way, multiple metric time series for the target metric from multiple nodes are joined and aggregated in a historically accurate way.

At operation 530, a submission of the topology join query is obtained. The submission may be associated with a target time period such as, for example, a five-minute window in time such as, for example, the past five minutes relative to a current time. The submission may be obtained from query/API server cluster 122 and may be submitted by query/API server cluster 122 to query cache cluster 118 in response to query/API server 120 of query/API server cluster 112 receiving a network request (e.g., a HTTP or HTTPS request) from GUI 128 to refresh or update a metric dashboard presented in a graphical user interface or in response to receiving a network request (e.g., a remote procedure call (RPC)) from alert watcher 124 for the purpose of comparing an alert threshold against a latest result of the topology-join query.

At operation 540, a historically accurate result for the submission of the topology-join query is determined based on the query cache. In particular, the historically accurate result may include a separate metric value for the target metric computed from each metric time series of the query cache. There may be a separate metric time series in query cache for each distinct value of the target node property contained in the metric buckets currently aggregated in the query cache for the topology join query. The metric value for a distinct target node property value can be computed by aggregating (e.g., summing or averaging) the metric values of entries in the metric time series for the distinct target node property value having time slots corresponding to the target time period. In this way, a separate metric value can be computed from each metric time series of the query cache for the target time period.

At operation 550, the historically accurate result is returned to a submitter of the topology join query. For example, the result may be returned to query/API server 120 of query/API server cluster 122, which in turn is returned to GUI 128 or alert watcher 124 where the result is displayed (e.g., charted) or processed (e.g., compared against an alert threshold).

As explained, process 500 may involve establishing a query cache for a topology join query. The topology join query may specify a target metric and a target node property by which to group the target metric. The query cache may be established for aggregating metric time series values for the target metric emitted by a set of nodes in a distributed computing system by distinct node property time series values for the target node property emitted by the set of nodes in a historically accurate manner. When a submission of the topology join query is obtained, a historically accurate result may be determined for the submission based on the query cache that has aggregated metric time series values for the target metric emitted by the set of nodes by distinct node property values for the target node property emitted by the set of nodes over a period of time (e.g., the past 24 hours). The historical accuracy is provided because the metric time series values for the target metric are aggregated in entries of the query cache that correspond to time slots associated with the metric time series values emitted by the set of nodes. In addition, because the metric time series values are aggregated by the distinct node property values, a historically accurate metric value can be efficiently computed for each distinct node property value by aggregating (e.g., summing or averaging) metric time series values in entries of the query cache for the distinct node property value.

As an example of process 500, consider Query 2 of FIG. 4, which is a topology-join query. Query cache 116-2 is established for topology join Query 2. Query 2 specifies a "requests" target metric and a "kernel" node property by which to group the "requests target metric. Query cache 116-2 is established for aggregating metric time series values for the "requests" target metric emitted by a set of nodes in distributed computing system 100 by distinct "kernel" node property time series values emitted by the set of nodes in a historically accurate manner. When a submission of Query 2 is obtained, a historically accurate result for the submission can be determined based on the query cache. The historically accurate result includes a respective metric value for the "request" target metric for each "kernel" distinct node property value. In this example, the distinct node property values include "4.18" and "4.19."

Note that the above-process 500 can be adapted to process tag-join queries. Examples of tag-join queries are Query 1 and Query 3 of FIG. 4. With a tag-join queries, instead of aggregating metric time series values for the target metric by distinct node property values for the target node property, metric time series values for the target metric are aggregated by distinct tag values for a target tag. For example, in Query 1 of FIG. 4 for which query cache 116-1 is established, the target metric is "requests" and the target tag by which to group the target metric is "method." Query cache 116-1 is established for aggregating metric time series values for the "requests" metric emitted by a set of nodes in system 110 by distinct tag values for the "method" tag emitted by the set of nodes in a historically accurate manner. When a submission of Query 1 is obtained by cluster 118, a historically accurate result for the submission can be determined based on query cache 116-1. The historically accurate result may include a respective metric value for the "requests" metric for each distinct tag value for the "method" tag emitted by the set of nodes. In this example, the distinct value values for the "method" tag include "Do" and "Perform."

As another example of a tag-join query, in Query 3 of FIG. 4 for which query cache 116-3 is established, the target metric is "requests" and the target tag by which to group the target metric is "node_id." Query cache 116-3 is established for aggregating metric time series values for the "requests" metric emitted by a set of nodes in system 110 by distinct tag values for the "node_id" tag emitted by the set of nodes in a historically accurate manner. When a submission of Query 3 is obtained by cluster 118, a historically accurate result for the submission can be determined based on query cache 116-3. The historically accurate result may include a respective metric value for the "requests" metric for each distinct tag value for the "node_id" tag emitted by the set of nodes. In this example, the distinct value values for the "node_id" tag include "123" and "456."

Query Language

Queries submitted to cluster 118 can be in the form of a query statement. The query statement can be express in a particular query language. While no particular query language is required, an example query language used in some disclosed embodiments will now be described.

According to some embodiments, the example query language provides the ability to express metric queries. A metric query may operate on a single metric. According to some embodiments, the basic form a metric query statement is as follows: metric_name[group_by1, . . . ]@topology/name{tag_name="tag_value", . . . }

Any part of the query can be omitted except for the metric name. For example, the following are all valid queries:
metric_name
metric_name[x]
metric_name{x="a"}
metric_name[x]{x="a"}
metric_name[@x]@topology/name
metric_name@topology/name{@x="a"}

Metric name identifies the metric being queried. The group-by section specifies a comma-separated list of tag values to group by. For example, metric_name[x] will produce a separate series for each distinct value of x. If you specify multiple tag names, there will be a separate series for each unique combination. For example, metric_name[x, y] will produce a separate series for each distinct (x, y) pair. If the tag name starts with "@", it is referring to a topology tag. The filter section specifies a comma-separated list of tag comparisons to match against. For example, metric_name{x="a"} will match series with the tag x="a". If you specify multiple filters, they must all match. For example, metric_name{x="a", y="b"} will match series with both the tag x="a" and the tag y="b". The comparison operator may be = or !=. The value of the comparison is a regular expression that must match the entire string. If a tag name starts with "@", it is referring to a topology tag. The topology portion of the query indicates a topology join for the query. Only a single topology join may be used. Since a topology is itself a metric, it may be joined on another topology like topology/node[kernel]@topology/yaps{@project="vortex2.query-cache"}.

Query Language—Topologies

Continuing discussion of the example query language, topologies are a special type of gauge that is used to identify nodes in a metric query. These can be used for a form of joining. A topology is a property of nodes that can be used to query any metrics reported from the same nodes. Since topologies are also a time series, topologies joins are historically accurate. A topology join does not just select nodes that currently match the topology query: a value in a time series will only be included if the topology query matched at the same time.

Topologies joins are indicated by "@" in the query. The topology being used must be listed before the filter component of the query: my_metric[ . . . ]@topology/x{ . . . }

For example, the query exclog/exceptions@topology/foo{@project="bar"} queries exclog/exceptions on hosts that match topology/foo{project="bar"}, Topology and non-topology filters can be combined in a query. For example, as in exclog/exceptions@topology/foo{@project="bar", severity="critical"}.

For example, The query exclog/exceptions[@deployment]@topology/foo{@project="bar"} queries exclog/exceptions on nodes that match topology/foo{project="bar"} and groups by a "foo" deployment. Note that since the filtering is by @project="bar", the group-by will only include deployments in the "bar" project. Topology and non-topology group-bys can be combined as in, for example, exclog/exceptions[severity, @deployment]@topology/foo{@project="bar"}.

Example Content Management System

Figure 6:
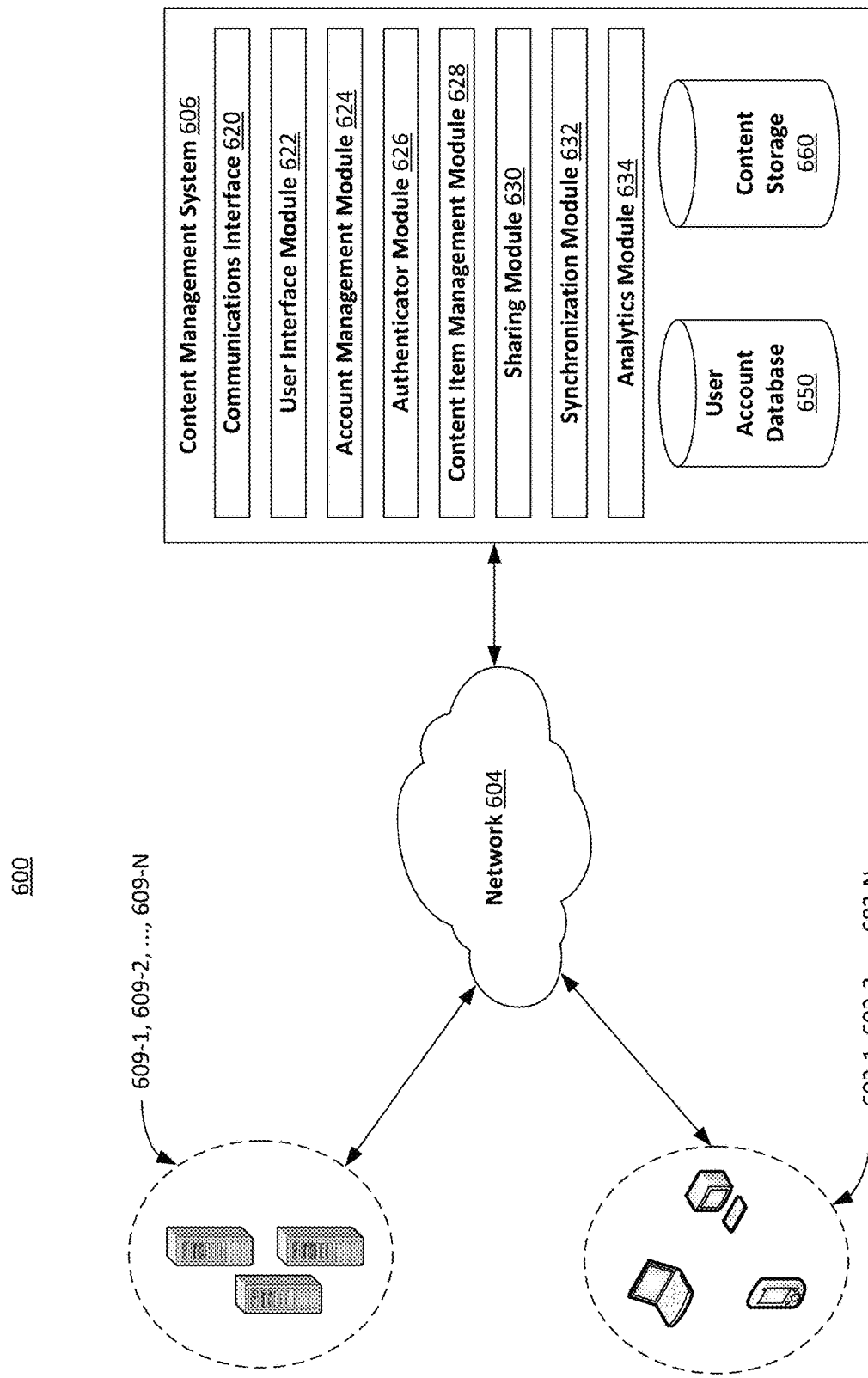
FIG. 6 depicts an example content management system, according to some disclosed embodiments.

With respect to implementing various embodiments of the disclosed technology, an example system configuration 600 is shown in FIG. 6, wherein electronic devices communicate via a network for purposes of exchanging content and other data. The system can be configured for use on a wide area network such as that illustrated in FIG. 6. However, the present principles are applicable to a wide variety of network configurations that facilitate the intercommunication of electronic devices. For example, each of the components of system 600 in FIG. 6 can be implemented in a localized or distributed fashion in a network.

In system 600, an end-user can interact with content management system 606 (e.g., an online synchronized content management system) through client devices 602-1 602-2 . . . , 602-N (collectively "602") connected to network 604 by direct and/or indirect communication. Content management system 606 can include a single computing device (e.g., a server) or multiple computing devices (e.g., multiple servers) that are configured to perform the functions and/or operations necessary to provide the services described herein.

Content management system 606 can support connections from a variety of different client devices, such as: desktop computers; mobile computers; mobile communications devices, e.g. mobile phones, smart phones, tablets; smart televisions; set-top boxes; and/or any other network enabled computing devices.

Client devices 602 can be of varying type, capabilities, operating systems, etc. Furthermore, content management system 606 can concurrently accept connections from and interact with multiple client devices 602.

An end-user can interact with content management system 606 via a client-side application installed on client device 602-X. In some embodiments, the client-side application can include a content management system specific component. For example, the component can be a stand-alone application, one or more application plug-ins, and/or a browser extension. However, the end-user can also interact with content management system 606 via a third-party application, such as a web browser, that resides on client device 602-X and is configured to communicate with content management system 606. In either case, the client-side application can present a user interface (UI) for the end-user to interact with content management system 606. For example, the end-user can interact with the content management system 606 via a client-side application integrated with the file system or via a webpage displayed using a web browser application.

Content management system 606 can enable an end-user to store content items, as well as perform a variety of content management tasks, such as retrieve, modify, browse, and/or share the content items. Furthermore, content management system 606 can enable an end-user to access the content from multiple client devices 602. For example, client device 602-X can upload content to content management system 606 via network 604. Later, the same client device 602-X or some other client device 602-Y can retrieve the content from content management system 606.

To facilitate the various content management services, an end-user can create an account with content management system 606. User account database 650 can maintain the account information. User account database 650 can store profile information for registered users. In some cases, the only personal information in the user profile can be a username and/or email address. However, content management system 606 can also be configured to accept additional user information such as birthday, address, billing information, etc.

User account database 650 can include account management information, such as account type (e.g. free or paid), usage information, (e.g. file edit history), maximum storage space authorized, storage space used, content storage locations, security settings, personal configuration settings, content sharing data, etc. Account management module 624 can be configured to update and/or obtain user account details in user account database 650. The account management module 624 can be configured to interact with any number of other modules in content management system 606.

An account can be used to store content items, such as digital data, documents, text files, audio files, video files, etc., from one or more client devices 602 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 660. Content storage 660 can be a storage device, multiple storage devices, or a server. Alternatively, content storage 660 can be a cloud storage provider or network storage accessible via one or more communications networks. Content management system 606 can hide the complexity and details from client devices 602 so that client devices 602 do not need to know exactly where or how the content items are being stored by content management system 606. In some embodiments, content management system 606 can store the content items in the same collection hierarchy as they appear on client device 602-X. However, content management system 606 can store the content items in its own order, arrangement, or hierarchy. Content management system 606 can store the content items in a network accessible storage (NAS) device, in a redundant array of independent disks (RAID), etc. Content storage 660 can store content items using one or more partition types, such as FAT, FAT32, NTFS, EXT2, EXT3, EXT4, HFS/HFS+, BTRFS, and so forth.

Content storage 660 can also store metadata describing content items, content item types, and the relationship of content items to various accounts, collections, or groups. The metadata for a content item can be stored as part of the content item or can be stored separately. In one variation, each content item stored in content storage 660 can be assigned a system-wide unique identifier.

Content storage 660 can decrease the amount of storage space required by identifying duplicate content items or duplicate segments of content items. Instead of storing multiple copies, content storage 660 can store a single copy and then use a pointer or other mechanism to link the duplicates to the single copy. Similarly, content storage 660 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 606 can be configured to support automatic synchronization of content items from one or more client devices 602. The synchronization can be platform agnostic. That is, the content items can be synchronized across multiple client devices 602 of varying type, capabilities, operating systems, etc. For example, client device 602-X can include client software, which synchronizes, via a synchronization module 632 at content management system 606, content in client device 602-X's file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, an end-user can manipulate content items directly in a local collection, while a background process monitors the local collection for changes and synchronizes those changes to content management system 606. Conversely, the background process can identify content items that have been updated at content management system 606 and synchronize those changes to the local collection. The client software can provide notifications of synchronization operations, and can provide indications of content statuses directly within the content management application. Sometimes client device 602-X may not have a network connection available. In this scenario, the client software can monitor the linked collection for content item changes and queue those changes for later synchronization to content management system 606 when a network connection is available. Similarly, an end-user can manually start, stop, pause, or resume synchronization with content management system 606.

An end-user can view or manipulate content via a web interface generated and served by user interface module 622. For example, the end-user can navigate in a web browser to a web address provided by content management system 606. Changes or updates to content in the content storage 660 made through the web interface, such as uploading a new version of a content item, can be propagated back to other client devices 602 associated with the end-user's account. For example, multiple client devices 602, each with their own client software, can be associated with a single account and content items in the account can be synchronized between each of the multiple client devices 602.

Content management system 106 can include a communications interface 620 for interfacing with various client devices 602, and can interact with other content and/or service providers 609-1, 609-2, . . . , 609-N (collectively "609") via an Application Program Interface (API). Certain software applications can access content storage 660 via an API on behalf of an end-user. For example, a software package, such as an app running on a smartphone or tablet computing device, can programmatically make calls directly to content management system 606, when an end-user provides credentials, to read, write, create, delete, share, or otherwise manipulate content. Similarly, the API can allow users to access all or part of content storage 660 through a web site.

Content management system 606 can also include authenticator module 626, which can verify user credentials, security tokens, API calls, specific client devices, and so forth, to ensure only authorized clients and users can access content items. Further, content management system 606 can include analytics module 634 module that can track and report on aggregate file operations, user actions, network usage, total storage space used, as well as other technology, usage, or business metrics. A privacy and/or security policy can prevent unauthorized access to user data stored with content management system 606.

Content management system 606 can include sharing module 630 for managing sharing content publicly or privately. Sharing content publicly can include making the content item accessible from any computing device in network communication with content management system 606. Sharing content privately can include linking a content item in content storage 660 with two or more user accounts so that each user account has access to the content item. The sharing can be performed in a platform agnostic manner. That is, the content can be shared across multiple client devices 602 of varying type, capabilities, operating systems, etc. The content can also be shared across varying types of user accounts.

In some embodiments, content management system 606 can be configured to maintain a content directory identifying the location of each content item in content storage 660. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 606 can use the content path to present the content items in the appropriate folder hierarchy.

A content entry can also include a content pointer that identifies the location of the content item in content storage 660. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 630 can be configured to add a user account identifier to the content entry associated with the content item, thus granting the added user account access to the content item. Sharing module 630 can also be configured to remove user account identifiers from a content entry to restrict a user account's access to the content item.

To share content publicly, sharing module 630 can be configured to generate a custom network address, such as a uniform resource locator (URL), which allows any web browser to access the content in content management system 606 without any authentication. To accomplish this, sharing module 630 can be configured to include content identification data in the generated URL, which can later be used to properly identify and return the requested content item. For example, sharing module 630 can be configured to include the user account identifier and the content path in the generated URL. Upon selection of the URL, the content identification data included in the URL can be transmitted to content management system 606 which can use the received content identification data to identify the appropriate content entry and return the content item associated with the content entry.

In addition to generating the URL, sharing module 630 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 630 can be configured to change the value of the flag to 1 or true after generating a URL to the content item.

In some embodiments, sharing module 630 can also be configured to deactivate a generated URL. For example, each content entry can also include a URL active flag indicating whether the content should be returned in response to a request from the generated URL. For example, sharing module 630 can be configured to only return a content item requested by a generated link if the URL active flag is set to 1 or true. Thus, access to a content item for which a URL has been generated can be easily restricted by changing the value of the URL active flag. This allows an end-user to restrict access to the shared content item without having to move the content item or delete the generated URL. Likewise, sharing module 630 can reactivate the URL by again changing the value of the URL active flag to 1 or true. An end-user can thus easily restore access to the content item without the need to generate a new URL.

While content management system 606 is presented with specific components, it should be understood by one skilled in the art, that the architectural configuration of system 606 is simply one possible configuration and that other configurations with more or fewer components are possible.

Computing System Implementation

Some disclosed embodiments encompass performance of a method by a computing system having one or more processors and storage media. The one or more processors and the storage media may be provided by one or more computing devices. The storage media of the computing system can store one or more computer programs. The one or more programs may include instructions configured to perform the method. The instructions may be executed by the one or more processors to perform the method.

Some disclosed embodiments encompass one or more non-transitory computer-readable media. The one or more non-transitory computer-readable media may store the one or more computer programs that include the instructions configured to perform the method.

Some disclosed embodiments encompass the computing system having the one or more processors and the storage media storing the one or more computer programs that include the instructions configured to perform the method.

Some disclosed embodiments encompass one or more virtual machines that logically operate on top of one or more computing devices and emulate computing hardware. A virtual machine can be a Type-1 or Type-2 hypervisor, for example. Operating system virtualization using containers is also possible instead of, or in conjunction with, computing hardware virtualization using hypervisors.

Some disclosed embodiments encompass multiple computing devices. The computing devices may be arranged in a distributed, parallel, clustered or other suitable multi-node computing configuration in which computing devices are continuously, periodically, or intermittently interconnected by one or more data communications networks (e.g., one or more Internet Protocol (IP) networks.) Further, it need not be the case that the set of computing devices that execute the instructions be the same set of computing devices that provide the storage media storing the one or more computer programs, and the sets may only partially overlap or may be mutually exclusive. For example, one set of computing devices may store the one or more computer programs from which another, different set of computing devices downloads the one or more computing devices and executes the instructions thereof.

Computing Device

FIG. 7 is a block diagram of a computing device 700, according to some disclosed embodiments. Computing device 700 may include bus 702 or other communication mechanism for communicating information, and one or more hardware processors 704 coupled with bus 702 for processing information.

Hardware processor 704 may include, for example, one or more general-purpose microprocessors, central processing units (CPUs) or cores thereof, graphics processing units (GPUs), or systems on a chip (SoCs).

Computing device 700 may also include a main memory 706, typically implemented by one or more volatile memory devices, coupled to bus 702 for storing information and instructions to be executed by processor 704. Main memory 706 also may be used for storing temporary variables or other intermediate information for execution of instructions by processor 704.

Computing device 700 may also include read-only memory (ROM) 708 or other static storage device coupled to bus 702 for storing static information and instructions for processor 704.

A storage system 710 implemented by one or more non-volatile memory devices may be provided and coupled to bus 702 for storing information and instructions.

Computing device 700 may be coupled via bus 702 to display 712, such as a liquid crystal display (LCD), a light emitting diode (LED) display, or a cathode ray tube (CRT), for displaying information to a computer user. Display 712 may be combined with a touch sensitive surface to form a touch screen display. The touch sensitive surface may be an input device for communicating information including direction information and command selections to processor 704 and for controlling cursor movement on display 712 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 714, including alphanumeric and other keys, may be coupled to bus 702 for communicating information and command selections to processor 704.

Another type of user input device may be cursor control 716, such as a mouse, a trackball, or cursor direction keys for communicating direction information and command selections to processor 704 and for controlling cursor movement on display 712. This input device may have two degrees of freedom in two axes, a first axis (e.g., x) and a second axis (e.g., y), that allows the device to specify positions in a plane.

Instructions, when stored in non-transitory storage media accessible to processor 704, such as, for example, main memory 706 or storage system 710, may render computing device 700 into a special-purpose machine that is customized to perform the operations specified in the instructions. Alternatively, customized hard-wired logic, one or more ASICs or FPGAs, firmware and/or hardware logic which in combination with the computing device may cause or program computing device 700 to be a special-purpose machine.

A computer-implemented process may be performed by computing device 700 in response to processor 704 executing one or more sequences of one or more instructions contained in main memory 706. Such instructions may be read into main memory 706 from another storage medium, such as storage system 710. Execution of the sequences of instructions contained in main memory 706 may cause processor 704 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 710) and/or volatile media (e.g., main memory 706). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 702. Transmission media can also take the form of acoustic or light waves, such as those generated for radio-wave and infra-red data communications.

Computing device 700 may also include a network interface 718 coupled to bus 702. Network interface 718 may provide a two-way data communication coupling to a wired or wireless network link 720 that is connected to a local, cellular or mobile network 722. For example, communication interface 718 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Communication interface 718 may send and receive electrical, electromagnetic or optical signals that carry digital data streams representing various types of information.

Network link 720 may provide data communication through one or more networks to other data devices. For example, network link 720 may provide a connection through network 722 to local computing device 724 that is also connected to network 722 or to data communication equipment operated by a network access provider 726 such as, for example, an internet service provider or a cellular network provider. Network access provider 726 in turn may provide data communication connectivity to another data communications network 728 (e.g., the internet). Networks 722 and 728 both may use electrical, electromagnetic or optical signals that carry digital data streams. The signals through the various networks and the signals on network link 720 and through communication interface 718, which carry the digital data to and from computing device 700, are example forms of transmission media.

Computing device 700 may send messages and receive data, including program code, through the networks 722 and 728, network link 720 and communication interface 718. In the internet example, a remote computing device 730 may transmit a requested code for an application program through network 728, network 722 and communication interface 718. The received code may be executed by processor 704 as it is received, and/or stored in storage device 710, or other non-volatile storage for later execution.

CONCLUSION

In the foregoing detailed description, some disclosed embodiments have been described with reference to numerous specific details that may vary from implementation to implementation. The detailed description and the figures are, accordingly, to be regarded in an illustrative rather than a restrictive sense.

A reference in the detailed description to some disclosed embodiments is not intended to mean that a disclosed embodiment is exclusive of another disclosed embodiment, unless the context clearly indicates otherwise. Thus, a disclosed embodiment may be combined with one or more other disclosed embodiments in a particular implementation, unless the context clearly indicates otherwise.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description and in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The invention claimed is:

1. A method comprising:
   receiving a plurality of metric buckets emitted from a set of nodes in a distributed computing system, each metric bucket of the plurality of metric buckets identifying a node in the set of nodes, each metric bucket of the plurality of metric buckets comprising a metric value for a target metric and comprising a node property value for a target node property;
   aggregating, in a query cache for a topology-join query, metric time series values by distinct node property time series values in a historically accurate manner, the topology-join query specifying the target metric and the target node property by which to group the target metric, the metric time series values being for the target metric and emitted by the set of nodes in the distributed computing system in the plurality of metric buckets, the distinct node property time series values for the target node property and emitted by the set of nodes in the plurality of metric buckets;
   wherein aggregating the metric time series values by distinct node property time series values in a historically accurate manner comprises, for each metric bucket of the plurality of metric buckets, aggregating the metric value for the target metric contained in the metric bucket in an entry of the query cache where the entry (i) has a time slot corresponding to a time slot associated with the metric bucket, and (ii) corresponds to the node property value for the target node property contained in the metric bucket;
   obtaining a submission of the topology-join query;
   determining a historically accurate result for the submission of the topology-join query based on the query cache, the historically accurate result including a respective metric value for the target metric for each node property value of a plurality of distinct node property values for the target node property emitted by the set of nodes; and returning the historically accurate result to a submitter of the submission of the topology-join query.

2. The method of claim 1, further comprising:

storing, as part of the query cache, a respective data structure for each node property value of the plurality of distinct node property values; and for each node property value of the plurality of distinct node property values, determining the respective metric value for the target metric of the historically accurate result based on aggregating metric values stored in the respective data structure.

3. The method of claim 1, further comprising:

updating a graphical user interface based on the historically accurate result.

4. The method of claim 1, further comprising:

comparing a metric value of the historically accurate result against an alert threshold.

5. The method of claim 1, further comprising:

obtaining a target time period associated with the submission of the topology-join query; and determining a respective metric value of the historically accurate result for a particular node property value of the plurality of distinct node property values based on summing a set of metric values, the set of metric values stored in the query cache, associated in the query cache with the particular node property value, and associated in the query cache with time slots within the target time period.

6. The method of claim 1, further comprising:

obtaining a target time period associated with the submission of the topology-join query; and determining a respective metric value of the historically accurate result for a particular node property value of the plurality of distinct node property values based on aggregating a set of metric values, the set of metric values stored in the query cache, associated in the query cache with the particular node property value, and associated in the query cache with time slots within the target time period.

7. One or more non-transitory computer-readable storage media storing instructions which, when executed by a computing system, cause the computing system to perform:

receiving a plurality of metric buckets emitted from a set of nodes in a distributed computing system, each metric bucket of the plurality of metric buckets identifying a node in the set of nodes, each metric bucket of the plurality of metric buckets comprising a metric value for a target metric and comprising a tag value for a target tag;

aggregating, in a query cache for a tag-join query, a set of metric time series values by a set of distinct tag time series values in a historically accurate manner, the tag-join query specifying the target metric and the target tag by which to group the target metric, the set of metric time series values for the target metric and emitted by the set of nodes in the distributed computing system in the plurality of metric buckets, the set of distinct tag time series values for the target tag and emitted by the set of nodes in the plurality of metric buckets;

wherein aggregating the set of metric time series values by distinct tag time series values in a historically accurate manner comprises, for each metric bucket of the plurality of metric buckets, aggregating the metric value for the target metric contained in the metric bucket in an entry of the query cache where the entry (i) has a time slot corresponding to a time slot associated with the metric bucket, and (ii) corresponds to the tag value for the target tag contained in the metric bucket;

obtaining a submission of the tag-join query;

determining a historically accurate result for the submission of the tag-join query based on the query cache, the historically accurate result including a respective metric value for the target metric for each tag value of a plurality of distinct tag values for the target tag emitted by the set of nodes; and returning the historically accurate result to a submitter of the submission of the tag-join query.

8. The one or more non-transitory computer-readable storage media of claim 7, the instructions, when executed by the computing system, further cause the computing system to perform:

obtaining a target time period associated with the submission of the tag-join query; and determining a respective metric value of the historically accurate result for a particular tag value of the plurality of distinct tag values based on aggregating a set of metric values, the set of metric values stored in the query cache, associated in the query cache with the particular tag value, and associated in the query cache with time slots within the target time period.

9. The one or more non-transitory computer-readable storage media of claim 7, the instructions, when executed by the computing system, further cause the computing system to perform:

storing, as part of the query cache, a respective data structure for each tag value of the plurality of distinct tag values; and for each tag value of the plurality of distinct tag values, determining the respective metric value for the target metric of the historically accurate result based on aggregating metric values stored in the respective data structure.

10. The one or more non-transitory computer-readable storage media of claim 7, wherein the submission of the tag-join query is obtained from a computing node in the distributed computing system.

11. The one or more non-transitory computer-readable storage media of claim 7, the instructions, when executed by the computing system, further cause the computing system to perform:

generating a bloom filter having indices set in the bloom filter wherein the indices set indicate that metric values for the target metric are relevant to the query cache; and registering the bloom filter with a metric collector that uses the bloom filter to determine which metric values received from the set of nodes are relevant to the query cache.

12. A computing system comprising:

one or more processors;

storage media storing instructions which, when executed by the one or more processors, cause the computing system to perform operations comprising:

receiving a plurality of metric buckets emitted from a set of nodes in a distributed computing system, each metric bucket of the plurality of metric buckets identifying a node in the set of nodes, each metric bucket of the plurality of metric buckets comprising a metric value for a target metric and comprising a node property value for a target node property;

aggregating, in a query cache for a topology-join query, metric time series values by distinct node property time series values, the topology-join query specifying the target metric and the target node property by which to group the target metric, the metric time series values for the target metric and streamed from the set of nodes in the distributed computing system in the plurality of metric buckets, the distinct node property time series values for the target node property and streamed from the set of nodes in a historically accurate manner in the plurality of metric buckets;

wherein aggregating the metric time series values by distinct node property time series values in a historically accurate manner comprises, for each metric bucket of the plurality of metric buckets, aggregating the metric value for the target metric contained in the metric bucket in an entry of the query cache where the entry (i) has a time slot corresponding to a time slot associated with the metric bucket, and (ii) corresponds to the node property value for the target node property contained in the metric bucket;

receiving a submission of the topology-join query;

computing a historically accurate result for the submission of the topology-join query based on the query cache, the historically accurate result including a respective metric value for the target metric for each node property value of a plurality of distinct node property values for the target node property emitted by the set of nodes; and providing the historically accurate result to a submitter of the submission of the topology-join query.

13. The computing system of claim 12, the operations further comprising:

storing, as part of the query cache, a respective circular queue for each node property value of the plurality of distinct node property values; and for each node property value of the plurality of distinct node property values, determining the respective metric value for the target metric of the historically accurate result based on aggregating metric values stored in the respective circular queue.

14. The computing system of claim 12, the operations further comprising:

displaying the historically accurate result in a graphical user interface.

15. The computing system of claim 12, the operations further comprising:

comparing a metric value of the historically accurate result against an alert threshold; and sending an alert if the metric value of the historically accurate results exceeds the alert threshold.

16. The computing system of claim 12, the operations further comprising:

obtaining a target time period associated with the submission of the topology-join query; and determining a respective metric value of the historically accurate result for a particular node property value of the plurality of distinct node property values based on averaging a set of metric values, the set of metric values stored in the query cache, associated in the query cache with the particular node property value, and associated in the query cache with time slots within the target time period.

17. The computing system of claim 12, the operations further comprising:

obtaining a target time period associated with the submission of the topology-join query; and determining a respective metric value of the historically accurate result for a particular node property value of the plurality of distinct node property values based on aggregating a set of metric values, the set of metric values stored in the query cache, associated in the query cache with the particular node property value, and associated in the query cache with time slots within the target time period.

\* \* \* \* \*